United States Patent
Nishimura et al.

(10) Patent No.: US 10,954,872 B2
(45) Date of Patent: Mar. 23, 2021

(54) EXHAUST GAS CONTROL DEVICE, METHOD, AND COMPUTER PROGRAM PRODUCT FOR AN ENGINE

(71) Applicant: Mazda Motor Corporation, Hiroshima (JP)

(72) Inventors: Hiroyuki Nishimura, Higashihiroshima (JP); Koichi Sugimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 87 days.

(21) Appl. No.: 16/262,977

(22) Filed: Jan. 31, 2019

(65) Prior Publication Data
US 2019/0234330 A1 Aug. 1, 2019

(30) Foreign Application Priority Data
Feb. 1, 2018 (JP) .............................. JP2018-016377

(51) Int. Cl.
*F02D 41/02* (2006.01)
*F01N 3/035* (2006.01)
(Continued)

(52) U.S. Cl.
CPC ........... *F02D 41/029* (2013.01); *F01N 3/035* (2013.01); *F01N 9/002* (2013.01); *F02D 41/025* (2013.01); *F02D 41/123* (2013.01); *F02D 41/402* (2013.01); *F02D 41/405* (2013.01); *F02D 35/023* (2013.01); *F02D 41/1456* (2013.01); *F02D 2200/021* (2013.01); *F02D 2200/0414* (2013.01)

(58) Field of Classification Search
CPC .... F01N 3/035; F01N 9/002; F02D 2200/021; F02D 2200/0414; F02D 35/023; F02D 41/025; F02D 41/029; F02D 41/123; F02D 41/1456; F02D 41/402; F02D 41/405
See application file for complete search history.

(56) References Cited

U.S. PATENT DOCUMENTS

2003/0221423 A1* 12/2003 Kosaka .................. F01N 9/002
60/297
2004/0025830 A1* 2/2004 Draper ............... F02M 63/0007
123/299
(Continued)

FOREIGN PATENT DOCUMENTS

JP 2004-316441 A 11/2004

*Primary Examiner* — Anthony Ayala Delgado
(74) *Attorney, Agent, or Firm* — Xsensus LLP

(57) ABSTRACT

An exhaust gas controller for an engine is equipped to appropriately regenerate a filter while restraining a deterioration in fuel efficiency. An oxidation catalyst and a filter capable of collecting particles in an exhaust passage, such that a regenerative injection in which fuel is injected for regenerating the filter is performed, even when a main injection is stopped. Under a first operating condition, in which the main injection is performed and a regeneration condition for the filter is satisfied, the regenerative injection is performed after the main injection. Under a second operating condition, in which the main injection is stopped and the regeneration condition for the filter is satisfied, a fuel injector is controlled to perform a former injection Q1 during a compression stroke and latter injections Q2, Q3 during an expansion stroke, as the regenerative injection.

20 Claims, 10 Drawing Sheets

(51) Int. Cl.
  *F01N 9/00* (2006.01)
  *F02D 41/12* (2006.01)
  *F02D 41/40* (2006.01)
  *F02D 41/14* (2006.01)
  *F02D 35/02* (2006.01)

(56) References Cited

U.S. PATENT DOCUMENTS

| | | | |
|---|---|---|---|
| 2011/0023478 A1* | 2/2011 | Oakley | F02D 41/1446 60/599 |
| 2013/0167509 A1* | 7/2013 | Nishimura | F02D 41/0055 60/274 |
| 2015/0017070 A1* | 1/2015 | Yamane | F02D 41/405 422/119 |
| 2015/0247441 A1* | 9/2015 | Takita | F01N 11/00 73/114.75 |

* cited by examiner

EXHAUST GAS CONTROL DEVICE, METHOD, AND COMPUTER PROGRAM PRODUCT FOR AN ENGINE

CROSS REFERENCES TO RELATED APPLICATIONS

This application claims priority to Japanese Patent Application 2018-016377, filed on Feb. 1, 2018, which is incorporated herein by reference. This application is also related to co-pending U.S. application Ser. No. 16/263,376, which is entitled "EXHAUST EMISSION CONTROL DEVICE, METHOD AND COMPUTER PROGRAM PRODUCT FOR AN ENGINE," filed concurrently with the present application, which is also incorporated by reference.

BACKGROUND

Technical Field

An exhaust gas control device may be applied to an engine including: an engine body including a cylinder and a fuel injection device that injects fuel into the cylinder; and an exhaust passage through which the exhaust gas discharged from the engine body flows.

Description of the Related Art

Conventionally, in an engine, a filter capable of collecting particles is provided in an exhaust passage. The engine performs regeneration control of regenerating the filter by removing the particles collected in the filter.

For example, Japanese Patent Laid-Open No. 2004-316441 discloses an engine in which an oxidation catalyst having an oxidation function is provided on the upstream side of the filter. The engine performs a post injection of injecting fuel at a time after a main injection for generating engine torque such that unburnt fuel flows into the oxidation catalyst and reacts in the oxidation catalyst. The resulting reaction heat increases the temperature of the exhaust gas passing through the filter to burn and remove the particles collected in the filter.

SUMMARY

However, as recognized by the present inventors, in the case where the main injection is stopped, for example, due to the deceleration of a vehicle on which the engine is mounted, the temperature of the exhaust gas to be discharged from an engine body significantly decreases. In this case, even when the post injection is performed, it is therefore not possible to sufficiently increase the temperature of the exhaust gas passing through the filter, leading to problems of the increase in filter regeneration time and the deterioration in fuel efficiency.

The present disclosure has been made in view of the above circumstance, and has an object to provide an exhaust gas control device for an engine that can appropriately regenerate the filter while avoiding a deterioration in fuel efficiency.

As an exemplary approach to address the issue, an embodiment provides an exhaust gas control device for an engine, the exhaust gas control device (or simply a controller) being applied to an engine including an engine body and an exhaust passage, the engine body including a cylinder and a fuel injection device (or fuel injector) that injects fuel into the cylinder, the exhaust passage being a passage through which exhaust gas discharged from the engine body flows, the exhaust gas control device including: a controller that controls the fuel injection device; an oxidation catalyst provided in the exhaust passage; and a filter provided in the exhaust passage, the filter being capable of collecting particles in the exhaust gas, the controller causes the fuel injector to perform a regenerative injection at a timing after a main injection during an expansion stroke under a first operating condition, the main injection being an injection in which the fuel is injected into the cylinder at a timing allowing engine torque to be generated, the regenerative injection being an injection in which the fuel is injected for regenerating the filter, the first operating condition being an operating condition that the main injection is performed and a regeneration condition for the filter is satisfied, the controller causes the fuel injector to perform a former injection during a compression stroke and a latter injection during the expansion stroke, as a regenerative injection, under a second operating condition, the regenerative injection being an injection in which the fuel is injected for regenerating the filter, the second operating condition being an operating condition that the main injection is stopped and the regeneration condition for the filter is satisfied.

According to this device, the regenerative injection is performed both when the main injection is performed and when the main injection is stopped. Therefore, the filter can be regenerated in a short time.

Furthermore, when the main injection is stopped, some of the fuel is injected into the cylinder during the compression stroke. Therefore, it is possible to promote the reaction of unburnt fuel in the oxidation catalyst, and to effectively increase the temperature in the filter.

Specifically, the temperature of the fuel injected into the cylinder in the compression stroke is increased by the compression action of a piston. When the temperature of the fuel becomes high, the fuel becomes light (the molecular weight decreases), so that the reactivity increases. Therefore, according to this device, when the main injection is stopped, it is possible to introduce the fuel into the oxidation catalyst in the light state, by injecting the fuel into the cylinder in the compression stroke as described above, and it is possible to promote the reaction of the fuel in the oxidation catalyst, and to effectively increase the temperature of the exhaust gas with a lower amount of fuel. Accordingly, it is possible to increase the temperature of the filter while restraining the deterioration in fuel efficiency, and to appropriately regenerate the filter.

However, if a large amount of fuel is injected into the cylinder in the compression stroke, there is concern that the fuel is burnt and the engine torque is generated, even though the main injection is stopped. In response, in this device, when the main injection is stopped, some of the fuel for the regenerative injection is injected into the cylinder in the expansion stroke. Therefore, the undesired generation of the engine torque is prevented while the reaction heat in the oxidation catalyst is secured by increasing the total amount of the unburnt fuel to be introduced into the oxidation catalyst, so that it is possible to effectively regenerate the filter.

In the above configuration, the controller increases an interval between the former injection and the latter injection when a cylinder inner pressure is high, compared to when the cylinder inner pressure is low, the cylinder inner pressure being a pressure in the cylinder.

According to this configuration, when the pressure in the cylinder is increased and the fuel is easily burnt in the cylinder, the interval between the former injection and the latter injection is increased, so that the fuel concentration in the cylinder is restrained from being locally rich (high). Therefore, when the main injection is stopped, it is possible to more surely prevent the engine torque from being undesirably generated due to the burning of the fuel in the cylinder.

In the above configuration, the controller advances a start time of the former injection and retard a start time of the latter injection when the cylinder inner pressure is high, compared to when the cylinder inner pressure is low.

According to this configuration, when the pressure in the cylinder, that is, the cylinder inner pressure is high and the fuel is easily burnt in the cylinder, the start time of the latter injection is set to a retarded time, and thereby, it is possible to more surely prevent the fuel for the latter injection from being burnt in the cylinder. Therewith, the former injection is performed at an advanced time, and thereby, the fuel for the former injection is diffused in the cylinder, so that it is possible to restrain the fuel concentration from being locally rich (high) and to more surely prevent the fuel from being burnt in the cylinder.

On the other hand, when the cylinder inner pressure is low, the start time of the latter injection is set to a time when a piston is closer to a compression top dead center, and thereby, the fuel for the latter injection can become a higher-temperature and lighter fuel, so that it is possible to further increase the temperature in the filter.

Further, when the cylinder inner pressure is low, the scattering distance of the fuel injected into the cylinder increases and the fuel adheres to a wall surface of the cylinder, and the like, so that the fuel easily leaks to the exterior of the cylinder. In response, in this configuration, when the cylinder inner pressure is low, the former injection is performed at a retarded timing when the cylinder inner pressure is higher. Therefore, it is possible to restrain the fuel for the former injection from leaking to the exterior of the cylinder.

In the above configuration, the controller increases an interval between the former injection and the latter injection when an equivalent ratio of air-fuel mixture in the cylinder is high, compared to when the equivalent ratio of the air-fuel mixture in the cylinder is low.

According to this configuration, when the equivalent ratio in the cylinder is high and the fuel is easily burnt in the cylinder, the interval between the former injection and the latter injection is increased, so that the fuel concentration in the cylinder is restrained from being excessively rich (high) locally. Therefore, when the main injection is stopped, it is possible to more surely prevent the engine torque from being undesirably generated due to the burning of the fuel in the cylinder.

In the above configuration, the controller retards a start time of the latter injection when the equivalent ratio of the air-fuel mixture in the cylinder is high, compared to when the equivalent ratio of the air-fuel mixture in the cylinder is low.

According to this configuration, when the equivalent ratio in the cylinder is high and the fuel is easily burnt in the cylinder, the start time of the latter injection is set to a retarded time, and thereby, it is possible to more surely prevent the fuel for the latter injection from being burnt in the cylinder. When the equivalent ratio in the cylinder is low, the start time of the latter injection is set to a time when the piston is closer to the compression top dead center, and thereby, the fuel for the latter injection becomes a higher-temperature and lighter fuel, so that it is possible to further increase the temperature in the filter.

In the above configuration, the controller increases an interval between the former injection and the latter injection when a temperature of engine coolant to be supplied to the engine body is high, compared to when the temperature of the engine coolant is low.

According to this configuration, when the temperature of the engine coolant is high, that is, the temperature of the engine body is high, and the fuel is easily burnt in the cylinder, the interval between the former injection and the latter injection is increased, so that the fuel concentration in the cylinder is restrained from being excessively rich (high) locally. Therefore, when the main injection is stopped, it is possible to more surely prevent the engine torque from being undesirably generated due to the burning of the fuel in the cylinder.

In the above configuration, the controller retards a start time of the latter injection when the temperature of the engine coolant is high, compared to when the temperature of the engine coolant is low.

According to this configuration, when the temperature of the engine coolant is high, that is, the temperature of the engine body is high, and the fuel is easily burnt in the cylinder, the start time of the latter injection is set to a retarded time, and thereby, it is possible to more surely prevent the fuel for the latter injection from being burnt in the cylinder. When the temperature of the engine coolant is low, the start time of the latter injection is set to a time when the piston is closer to the compression top dead center, and thereby, the fuel for the latter injection becomes a higher-temperature and lighter fuel, so that it is possible to further increase the temperature in the filter.

In the above configuration, the controller increases an interval between the former injection and the latter injection when a temperature of intake gas to be introduced into the cylinder is high, compared to when the temperature of the intake gas to be introduced into the cylinder is low.

According to this configuration, when the temperature of the intake gas to be introduced into the engine body and the temperature in the cylinder are high and the fuel in the cylinder is easily burnt, the interval between the former injection and the latter injection is increased, so that the fuel concentration in the cylinder is restrained from being excessively rich (high) locally. Therefore, when the main injection is stopped, it is possible to more surely prevent the engine torque from being undesirably generated due to the burning of the fuel in the cylinder.

In the above configuration, the controller retards a start time of the latter injection when the temperature of the intake gas to be introduced into the cylinder is high, compared to when the temperature of the intake gas to be introduced into the cylinder is low.

According to this configuration, when the temperature of the intake gas to be introduced into the engine body is high and the fuel is easily burnt in the cylinder, the start time of the latter injection is set to a retarded time, and thereby, it is possible to more surely prevent the fuel for the latter injection from being burnt in the cylinder. When the temperature of the intake gas is low, the start time of the latter injection is set to a time when the piston is closer to the compression top dead center, and thereby, the fuel for the latter injection becomes a higher-temperature and lighter fuel, so that it is possible to further increase the temperature in the filter.

In the above configuration, the time when the former injection is performed and the time when the latter injection is performed include a latter period of the compression stroke and a former period of the expansion stroke, respectively.

In the above configuration, the controller performs the latter injection in two injections: a first latter injection and a second latter injection.

According to this configuration, when the main injection is stopped, while maintaining a large amount as the total amount of the fuel to be introduced into the oxidation catalyst, it is possible to prevent a large amount of fuel from being injected into the cylinder at one time, and therefore, it is possible to prevent the fuel concentration in the cylinder from being locally rich and to prevent the engine torque from being undesirably generated.

In the above configuration, the controller reduces an injection amount of the regenerative injection to be performed under the second operating condition, compared to an injection amount of the regenerative injection to be performed under the first operating condition.

According to this configuration, when the main injection is stopped, the injection amount of the regenerative injection is reduced, and thereby, it is possible to more surely restrain the fuel for the regenerative injection from being burnt in the cylinder. On the other hand, when the main injection is performed, the change rate of the engine torque to an engine torque when the fuel for the regenerative injection is not burnt is low, even if some of the fuel for the regenerative injection is burnt. In response, according to this configuration, when the main injection is performed, the injection amount of the regenerative injection is increased, and thereby, it is possible to further increase the temperature of the filter.

According to the present disclosure, it is possible to appropriately regenerate the filter while restraining the deterioration in fuel efficiency.

DETAILED DESCRIPTION OF THE EMBODIMENTS

Hereinafter, an exhaust gas control device (sometimes referred to as an exhaust gas controller, or also control circuitry or control circuitry configured by software to perform exhaust gas control) for an engine according to an embodiment of the present invention will be described with reference to the drawings.

(1) Overall Configuration

Figure 1:
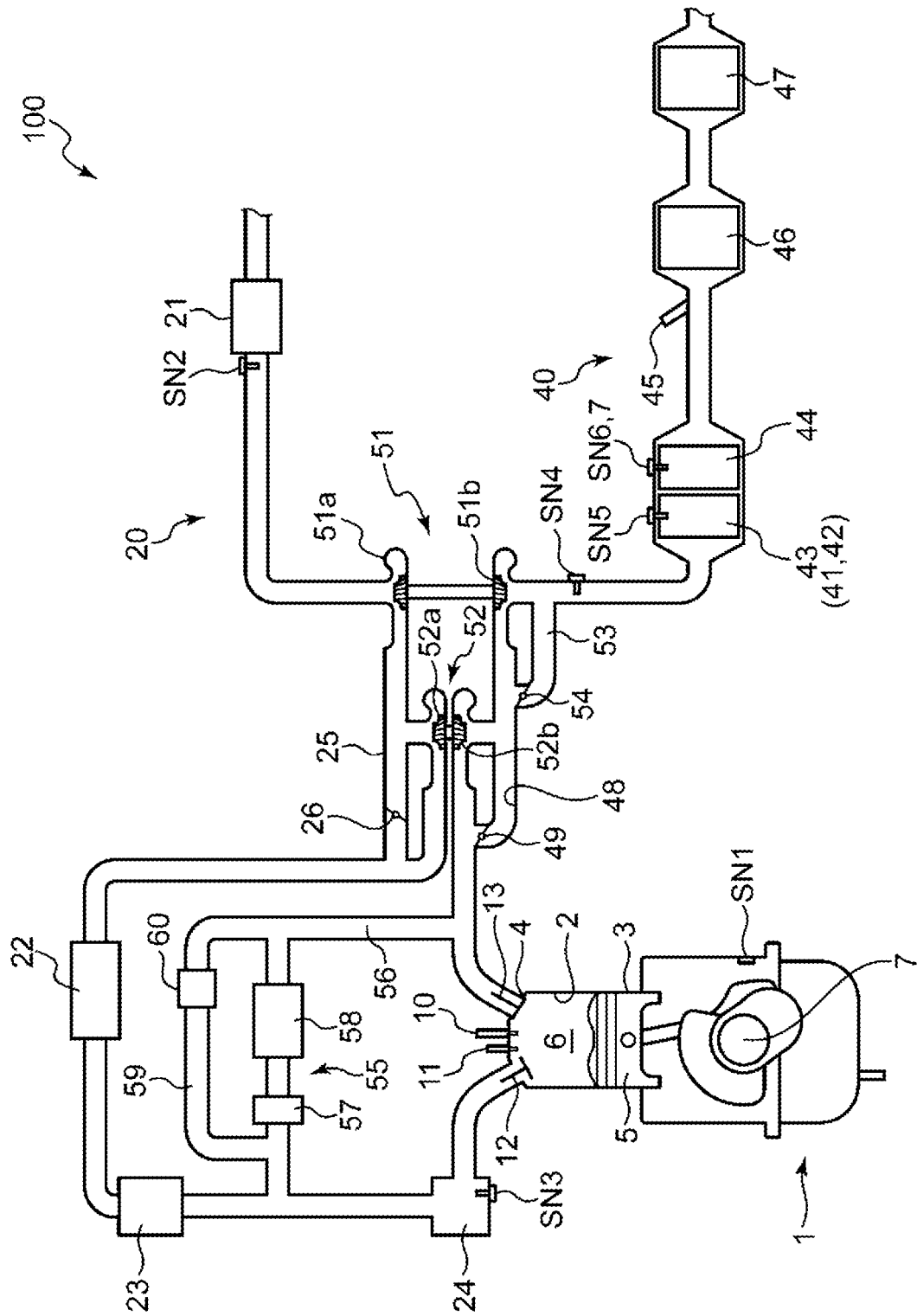
FIG. 1 is a schematic configuration diagram of an engine system to which an exhaust gas control device for an engine according to an embodiment of the present invention is applied.

FIG. 1 is a schematic configuration diagram of an engine system 100 to which an exhaust gas control device for an engine in the embodiment is applied.

The engine system 100 includes a four-stroke engine body 1, an intake passage 20 for introducing air (intake gas) to the engine body 1, an exhaust passage 40 for discharging exhaust gas from the engine body 1 to the exterior, a first turbocharger 51 and a second turbocharger 52. The engine system 100 is provided in a vehicle, and the engine body 1 is used as a drive source of the vehicle. For example, the engine body 1 is a diesel engine, and includes four cylinders 2 that are arrayed in a direction orthogonal to a sheet plane of FIG. 1.

The engine body 1 includes a cylinder block 3 in which the cylinders 2 are formed in the interior, a cylinder head 4 that is provided on an upper surface of the cylinder block 3, and pistons 5 that are inserted into the cylinders 2 so as to be capable of sliding and reciprocating. Above the pistons 5, combustion chambers 6 are formed.

Engine coolant for cooling the engine body 1 is supplied to the engine body 1. Specifically, a water jacket through which the engine coolant flows is formed in the cylinder block 3 and the cylinder head 4, and the engine coolant is supplied to the water jacket.

Each piston 5 is linked with a crankshaft 7, and the crankshaft 7 rotates around the central axis, depending on the reciprocating motion of the piston 5.

In each cylinder head 4, a respective injector (fuel injection device, fuel injector, or simply "injector") 10 is provided that injects fuel into the combustion chamber 6 (into the cylinder 2) and a glow plug 11 for increasing the temperature of air-fuel mixture of air and fuel in the combustion chamber 6. Because there is a fuel injector 10 in each cylinder 2, each engine body 1 has a set of fuel injectors.

In the example shown in FIG. 1, the injector 10 is provided at the center of a top surface of the combustion chamber 6, so as to be oriented toward the combustion chamber 6 from the upper side. The glow plug 11 has a heat generation part that generates heat when electricity is applied, at the tip. The glow plug 11 is attached to the top surface of the combustion chamber 6, such that the heat generation part is positioned near a tip portion of the injector 10. For example, the injector 10 has a plurality of nozzle holes at the tip, and the glow plug 11 is disposed such that the heat generation part is positioned among a plurality of sprays from the plurality of nozzle holes of the injector 10 and does not contact directly with the sprays of the fuel.

The cylinder head 4 is provided with an intake port for introducing the air supplied from the intake passage 20, into each combustion chamber 6, an intake valve 12 for opening and closing the intake port, an exhaust port for introducing the exhaust gas generated in each combustion chamber 6, into the exhaust passage 40, and an exhaust valve 13 for opening and closing the exhaust port.

The intake passage 20 is provided with an air cleaner 21, a compressor 51a (hereinafter, referred to as a first compressor 51a, when appropriate) of the first turbocharger 51, a compressor 52a (hereinafter, referred to as a second compressor 52a, when appropriate) of the second turbocharger 52, an inter cooler 22, a throttle valve 23 and a surge tank 24, in that order from the upstream side. Further, the intake passage 20 is provided with an intake-side bypass passage 25 for bypassing the second compressor 52a and an intake-side bypass valve 26 that opens and closes the intake-side bypass passage 25. The intake-side bypass valve 26 is switched between a fully closed state and a fully open state, by a drive device (not illustrated).

The exhaust passage 40 is provided with a turbine 52b (hereinafter, referred to as a second turbine 52b, when appropriate) of the second turbocharger 52, a turbine 51b (hereinafter, referred to as a first turbine 51b, when appropriate) of the first turbocharger 51, a first catalyst 43, a DPF (Diesel Particulate Filter) 44, a urea injector 45 that injects urea into the exhaust passage 40 on the downstream side of the DPF 44, an SCR (Selective Catalytic Reduction) catalyst 46 that purifies NOx using the urea injected from the urea injector 45, and a slip catalyst 47 that oxidizes and purifies unreacted ammonia discharged from the SCR catalyst 46, in that order from the upstream side.

The DPF 44 is a filter for collecting particulate matter (PM) in the exhaust gas. For example, the DPF 44 is constituted by a wall flow type filter formed of a heat-resistant ceramic material such as silicon carbide (SiC) and cordierite or a three-dimensional netlike filter formed of a heat-resistant ceramic fiber. More specifically, in the DPF 44, many passages are formed in a grid pattern, by a porous ceramics or the like, and first passages in which an exhaust upstream side is opened and an exhaust downstream side is closed and second passages in which an exhaust upstream side is closed and an exhaust downstream side is opened are alternately arranged in a zigzag pattern. The exhaust gas having entered the first passage penetrates the second passage, by passing through a partition wall that separates the passages from each other. At this time, the partition wall functions as a filter that prevents the penetration of the particulate matter into the second passage, so that the particulate matter is collected in the partition wall.

There are limitations to the amount of the particulate matter (PM) that can be collected by the DPF 44. Accordingly, when appropriate, it is beneficial to remove the collected PM from the DPF 44. The PM collected in the DPF 44 burns by receiving the supply of oxygen at a high temperature, so that the PM is removed from the DPF 44. The temperature at which the PM is removed by burning is about 600° C., which is a relatively high temperature. Accordingly, in order that the PM is removed from the DPF 44 by burning, the temperature of the DPF 44 needs to be a high temperature (e.g., at least near 600° C., but also at or more than 600° C.)

The first catalyst 43 includes a NOx catalyst 41 that purifies NOx, and an oxidation catalyst (DOC: Diesel Oxidation Catalyst) 42.

The oxidation catalyst 42, by oxidation, changes hydrocarbon (HC), that is, unburnt fuel, carbon monoxide (CO) and the like into water and carbon dioxide, using oxygen in the exhaust gas. For example, the oxidation catalyst 42 consists of platinum or a mixture of platinum and palladium supported by a carrier. Here, the oxidation reaction that occurs in the oxidation catalyst 42 is an exothermal reaction, and when the oxidation reaction occurs in the oxidation catalyst 42, the temperature of the exhaust gas is increased.

The NOx catalyst 41 is a NOx storage-reduction type catalyst (NSC: NOx Storage Catalyst) that stores NOx in the exhaust gas, in a lean state in which the air-fuel ratio (A/F, the ratio of A: the air (oxygen) contained in the exhaust gas to F: the fuel (H) contained in the exhaust gas) of the exhaust gas is higher than the theoretical air-fuel ratio, and that reduces the stored NOx in a rich state in which the air-fuel ratio of the exhaust gas is close to the theoretical air-fuel ratio or lower than the theoretical air-fuel ratio.

The first catalyst 43 is formed, for example, by coating the surface of a catalyst material layer of the DOC with a catalyst material of the NSC.

The exhaust passage 40 is provided with an exhaust-side bypass passage 48 for bypassing the second turbine 52b, an exhaust-side bypass valve 49 that opens and closes the exhaust-side bypass passage 48, a waste gate passage 53 for bypassing the first turbine 51b, and a waste gate valve 54 that opens and closes the waste gate passage 53.

The engine system 100 according to the embodiment can execute an exhaust gas recirculation (EGR) in which some (EGR gas) of the exhaust gas is returned to the intake gas, and includes an EGR device 55 for executing the EGR. The EGR device 55 includes an EGR passage 56 that connects a portion of the exhaust passage 40 on the upstream side of the upstream end of the exhaust-side bypass passage 48 and a portion of the intake passage 20 between the throttle valve 23 and the surge tank 24, a first EGR valve 57 that opens and closes the EGR passage 56, and an EGR cooler 58 that cools the exhaust gas passing through the EGR passage 56. Further, the EGR device 55 includes an EGR-cooler bypass passage 59 for bypassing the EGR cooler 58, and a second EGR valve 60 that opens and closes the EGR-cooler bypass passage 59.

(2) Control System

Figure 2:
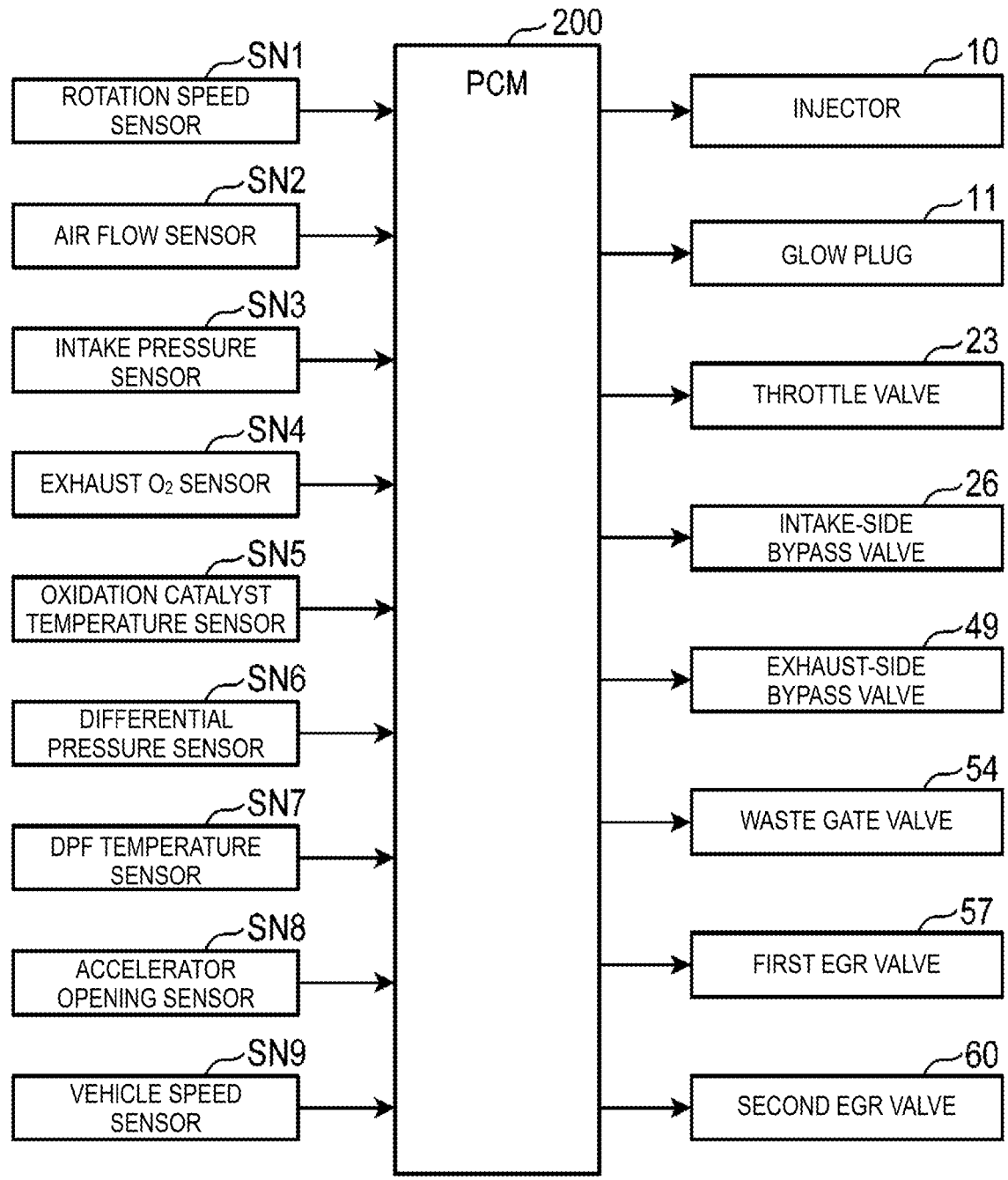
FIG. 2 is a block diagram showing a control system of the engine system.

A control system of the engine system will be described with use of FIG. 2. The engine system 100 in the embodiment is controlled mainly by a PCM (controller, Powertrain Control Module) 200 mounted on the vehicle. The PCM 200 is a microprocessor constituted by a CPU, a ROM, a RAM, an I/F and the like, and corresponds to the controller (control circuitry, or control means, or circuitry configured, by software, to provide powertrain control) according to the present disclosure.

To the PCM 200, information from various sensors is input.

For example, the engine system 100 is provided with a rotation speed sensor SN1 that detects the rotation speed of the crankshaft 7, that is, engine speed, an air flow sensor SN2 that is provided near the air cleaner 21 and that detects the amount of the intake gas (air) flowing through the intake passage 20, an intake pressure sensor SN3 that detects an intake pressure of the gas flowing into the combustion chamber 6 (cylinder 2), that is, the pressure of the intake gas, an exhaust O2 sensor SN4 that detects the oxygen concentration at a portion of the exhaust passage 40 between the first turbine 51b and the first catalyst 43, an oxidation catalyst temperature sensor SN5 that detects the temperature of the oxidation catalyst 42, a differential sensor SN6 that detects the differential pressure between before and after the DPF 44 (the difference in pressure between an upstream portion and downstream portion of the exhaust passage 40 with respect to the DPF 44), a DPF temperature sensor SN7 that detects the temperature of the DPF 44, and the like. The intake pressure sensor SN3, which is attached to the surge tank 24, detects the pressure in the surge tank 24, that is, the pressure of the intake gas turbocharged by the turbochargers 51, 52. Further, the cylinder block 3 is provided with an engine coolant temperature sensor (not illustrated) that detects an engine coolant temperature, i.e., the temperature of the engine coolant. The intake passage 20 is provided with an intake temperature sensor (not illustrated) that detects an intake temperature, i.e., the temperature of the intake gas to be introduced into the combustion chamber 6. For example, the intake temperature sensor is provided near the air cleaner 21.

Further, the vehicle is provided with an accelerator opening sensor SN8 that detects an accelerator opening, i.e., the opening of an accelerator pedal (not illustrated) to be operated by a driver, a vehicle speed sensor SN9 that detects vehicle speed, and the like.

The PCM 200 receives input signals from the sensors SN1 to SN9, and the like, executes various computations based on the signals, and controls the injector 10 and the like.

(2-1) Normal Operation Control

At a time of a normal operation in which a DPF regeneration control (regeneration control) described later is not performed, the PCM 200 determines a required torque (an engine load required), mainly based on the engine speed and the accelerator opening, and causes the injector 10 to perform a main injection such that the required torque is realized. That is, in the main injection, a relatively large amount of fuel, which is the fuel for generating the engine torque, is injected into the combustion chamber 6. For example, the main injection is performed when the piston is close to a compression top dead center.

Further, the PCM 200 changes the openings of the EGR valves 57, 60, the exhaust-side bypass valve 49 and the like, such that the EGR rate (the rate of the EGR gas amount to the total gas amount in the combustion chamber 6) and the intake pressure become appropriate values corresponding to the engine speed, the required torque and the like. Then, when the required torque becomes 0 due to the deceleration of the vehicle or the like, the PCM 200 stops the main injection, that is, performs a fuel cut. The embodiment is configured such that the excess air ratio $\lambda$ of the air-fuel mixture in the combustion chamber 6 is higher than 1 at the time of the normal operation, for increasing the fuel efficiency, and the throttle valve 23 is maintained in a nearly fully open state at the time of the normal operation. For example, at the time of the normal operation, the excess air ratio $\lambda$ of the air-fuel mixture in the combustion chamber 6 is set to about 1.7.

(2-2) DPF Control

The DPF regeneration control for regenerating the DPF 44 by removing the PM collected in the DPF 44 by burning will be described.

In the embodiment, while the air-fuel ratio of the air-fuel mixture in the combustion chamber 6 is higher than the theoretical air-fuel ratio and the air-fuel ratio of the exhaust gas is higher than the theoretical air-fuel ratio, unburnt fuel is introduced into the oxidation catalyst 42, so that the oxidation reaction of the fuel occurs in the oxidation catalyst 42. Thereby, the temperature of the exhaust gas to be introduced into the DPF 44 and the temperature of the DPF 44 become higher temperatures (e.g., at or above 600° C.), so that the PM collected in the DPF 44 is removed by burning. Specifically, as the DPF regeneration control for regenerating the DPF 44, the PCM 200 sets the excess air ratio $\lambda$ of the air-fuel mixture and the excess air ratio $\lambda$ of the exhaust gas to values greater than 1, and performs a regenerative injection in which the fuel for regenerating the DPF 44 by supplying unburnt fuel to the oxidation catalyst 42 is first injected into the combustion chamber 6.

Figure 3:
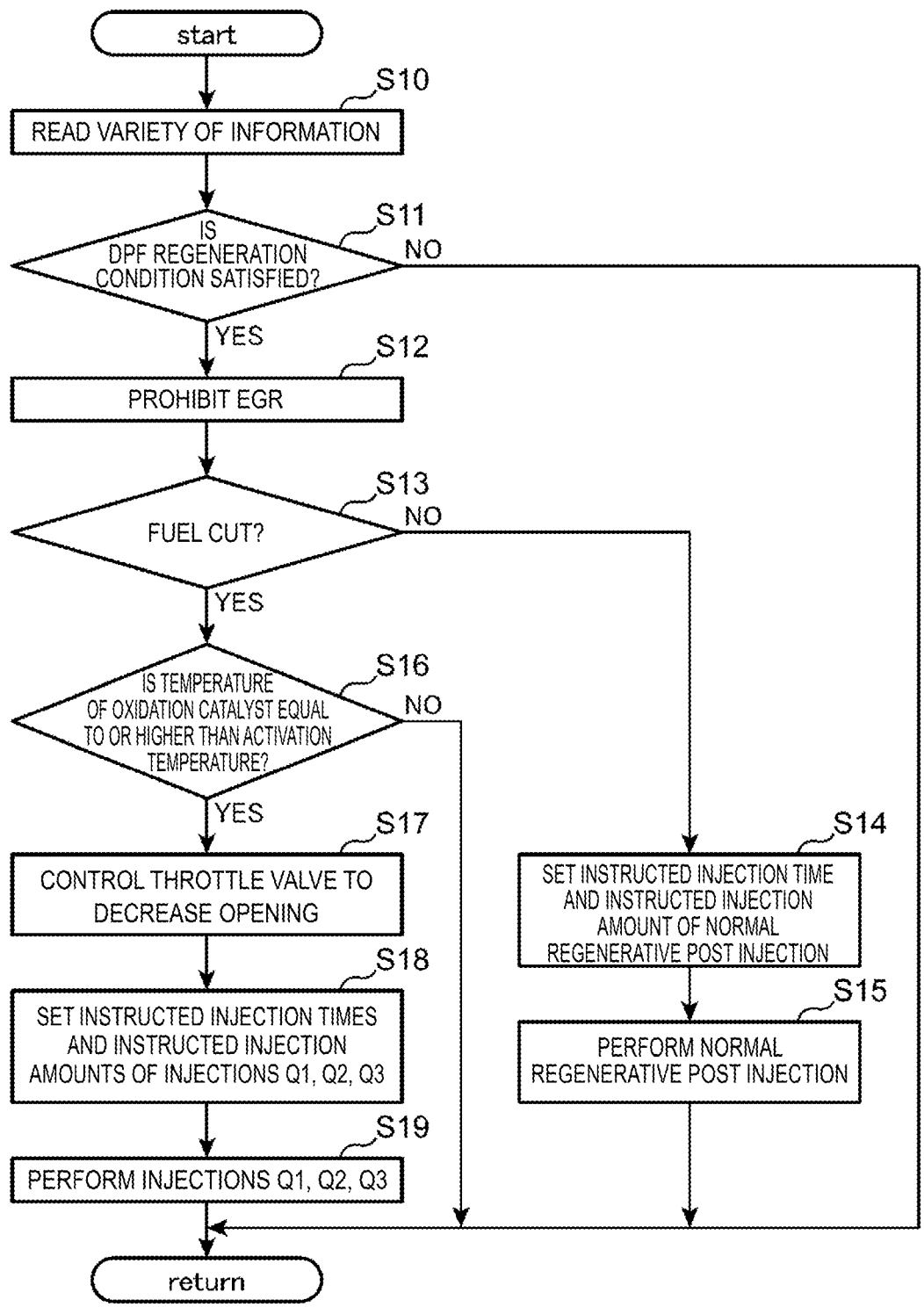
FIG. 3 is a flowchart showing a flow of a Diesel Particulate Filter (DPF) regeneration control process.

FIG. 3 is a flowchart showing a flow of the DPF regeneration control.

First, in step S10, the PCM 200 reads a variety of information such as the intake pressure detected by the intake pressure sensor SN3, the oxygen concentration (hereinafter, referred to as exhaust O2 concentration) detected by the exhaust O2 sensor SN4, the temperature of the oxidation catalyst 42 detected by the oxidation catalyst temperature sensor SN5, the differential pressure between before and after the DPF 44 detected by the differential pressure sensor SN6, and the temperature of the DPF 44 detected by the DPF temperature sensor SN7.

Next, in step S11, the PCM 200 determines whether a DPF regeneration condition (filter regeneration condition) is satisfied.

The DPF regeneration condition is a condition where it can be determined that the regeneration of the DPF 44 is necessary. The PCM 200 estimates the amount of the PM collected in the DPF 44, using the differential pressure between before and after the DPF 44 and the like. When the estimated amount of the PM is equal to or more than a preset first DPF regeneration determination amount, the PCM 200 determines that the DPF 44 should be regenerated and the DPF regeneration condition is satisfied. On the other hand, when the estimated amount of the PM is less than the preset first DPF regeneration determination amount, the PCM 200 determines that the DPF regeneration condition is not satisfied. Once the PCM 200 determines that the DPF regeneration condition is satisfied, the PCM 200 determines that the DPF regeneration condition is satisfied, until the estimated amount of the PM becomes less than a preset second DPF regeneration determination amount (<the first DPF regeneration determination amount).

When the determination of NO is made in step S11 and the DPF regeneration condition is not satisfied, the process ends without the DPF regeneration control (the control at the time of the normal operation is performed, and the process returns to step S10).

On the other hand, when the determination of YES is made in step S11 and the DPF regeneration condition is satisfied, the PCM 200 proceeds to step S12. In step S12, the PCM 200 prohibits the EGR. That is, the PCM 200 fully closes the EGR valves 57, 60.

Next to step S12, the PCM 200 proceeds to step S13. In step S13, the PCM 200 determines whether the fuel cut is being performed. As described above, when the required torque becomes equal to or less than 0 due to the deceleration of the vehicle or the like, the fuel cut in which the main injection is stopped is performed. The PCM 200 separately determines whether the fuel cut should be performed, using the accelerator opening and the like, and when the PCM 200 determines that the fuel cut should be performed, the PCM 200 stops the main injection and makes the determination of YES in step S13.

In the case where the determination of NO is made in step S13, where the fuel cut is not performed and where the main injection is performed, that is, under a first operating condition that the main injection is performed and the regeneration condition for the DPF 44 is satisfied, the PCM 200 performs the normal regeneration control.

Figure 4A:
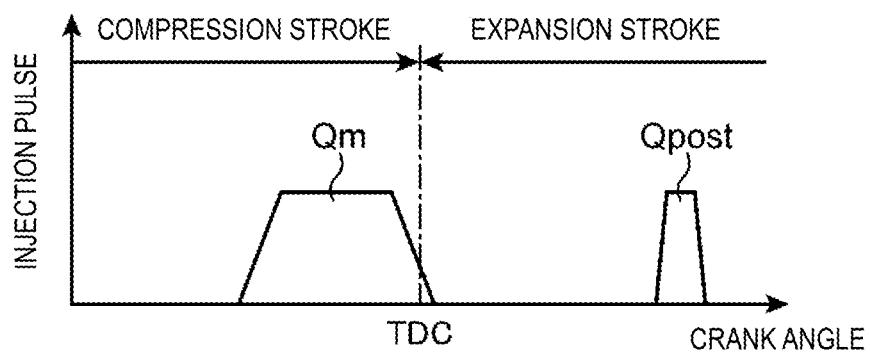
FIG. 4A is a diagram showing an injection pattern at a time of a normal regeneration control of the DPF regeneration control process.

In the normal regeneration control, the regenerative injection is performed during the expansion stroke after the main injection. That is, the PCM 200 causes the injector 10 to inject the fuel into the combustion chamber 6 during the expansion stroke after the main injection. In the normal regeneration control, as shown in FIG. 4A, a regenerative injection Qpost is performed only once, after a main injection Qm. Hereinafter, the regenerative injection in the normal regeneration control is referred to as a normal regenerative post injection, when appropriate.

Specifically, when the determination of NO is made in step S13, the PCM 200 proceeds to step S14. In step S14, the PCM 200 sets an instructed injection time that is an instructed value of the start time of the normal regenerative post injection, and an instructed injection amount that is the amount of the fuel to be injected to the combustion chamber 6 by the normal regenerative post injection.

Hereinafter, when appropriate, the fuel to be injected into the combustion chamber 6 by a normal regenerative post  injection is referred to as the fuel for the normal regenerative post  injection, and the amount of the fuel to be injected into the combustion chamber 6 by the normal regenerative post  injection is referred to as the injection amount of the normal regenerative post  injection. Further, the start time of the normal regenerative post  injection is merely referred to as the injection time of the normal regenerative post  injection.

In the embodiment, a basic post injection time that is a basic value of the injection time of the normal regenerative post injection and a basic post injection amount that is a basic value of the injection amount of the normal regenerative post injection are preset corresponding on the engine speed, the required torque and the like, and are stored as a map in the PCM 200. From this map, the PCM 200 extracts values corresponding to the engine speed, the required torque and the like at the current time (at the time when step S14 is performed). Then, the PCM 200 sets the basic post injection time and the basic post injection amount, as the instructed injection time and instructed injection amount of the normal regenerative post injection, without performing the correction with the exhaust O2 concentration and the like.

The basic post injection time and the basic post injection amount are set to a time and amount allowing the fuel for the normal regenerative post injection not to be burnt in the combustion chamber 6. For example, the basic post injection time is set to about 80° crank angle (CA) after the top dead center (ATDC) to 120° CA after the top dead center (ATDC). Further, the basic post injection amount is set to an amount allowing the excess air ratio $\lambda$ of the exhaust gas to be 1.2 to 1.4, and for example, is about 10 mm$^3$/st.

After step S14, the PCM 200 proceeds to step S15, and performs the normal regenerative post injection. On this occasion, the PCM 200 causes the injector 10 to inject the fuel by the instructed injection amount set in step S15, at the instructed injection time set in step S15. In step S15, the main injection is performed as described above, and the normal regenerative post injection is performed after the main injection.

Thus, when the DPF regeneration control is performed in the state where the fuel cut is not performed and the main injection is performed, the normal regenerative post injection is performed once during the expansion stroke after the main injection. Therefore, by the normal regenerative post injection, the fuel introduced into the combustion chamber 6 is discharged to the exhaust passage 40, without being burnt, and the oxidation reaction of the unburnt fuel occurs in the oxidation catalyst 42.

As described above, when the normal regenerative post injection is performed (when the normal regeneration control is performed), the openings of the throttle valve 23, the exhaust-side bypass valve 49 and the like are adjusted such that the excess air ratio $\lambda$ of the air-fuel mixture in the combustion chamber 6 and the excess air ratio $\lambda$ in the exhaust passage 40 are higher than 1 and the excess air ratio $\lambda$ of the exhaust gas is about 1.2 to 1.4 as described above.

On the other hand, when the determination of YES is made in step S13 and the fuel cut is performed, that is, under a second operating condition that the fuel cut is performed in the state where the DPF regeneration condition is satisfied, the PCM 200 proceeds to step S16.

In step S16, the PCM 200 determines whether the temperature of the oxidation catalyst 42 is equal to or higher than an activation temperature. The activation temperature, which is the lowest value of the temperature allowing the oxidation reaction of the fuel to occur in the oxidation catalyst 42, is preset and stored in the PCM 200.

When the determination of NO is made in step S16, the oxidation reaction is not expected to occur in the oxidation catalyst 42, and therefore, the process ends without the DPF regeneration control (the process returns to step S10). When the normal regeneration control is performed, the main injection is performed, and therefore, it is thought that the oxidation catalyst 42 is maintained at a high temperature. Therefore, when the DPF regeneration condition is satisfied in the state where the main injection is performed, the determination in step S16 is not performed.

On the other hand, when the determination of YES is made in step S16 and the temperature of the oxidation catalyst 42 is equal to or higher than the activation temperature, a fuel-cut regeneration control is performed.

When the determination of YES is made in step S16, the PCM 200, first, proceeds to step S17, and decreases the opening of the throttle valve 23 compared to when the normal regeneration control is performed. Specifically, when the normal regeneration control is performed or when the DPF regeneration control is not performed, the throttle valve 23 is nearly fully opened. In contrast, in step S17, the opening of the throttle valve 23 is set to an opening near the fully closed state. Here, the opening of the throttle valve 23 is set to such an opening that the excess air ratio $\lambda$ in the exhaust passage 40 and the excess air ratio $\lambda$ of the air-fuel mixture in the combustion chamber 6 are higher than 1.

Figure 4B:
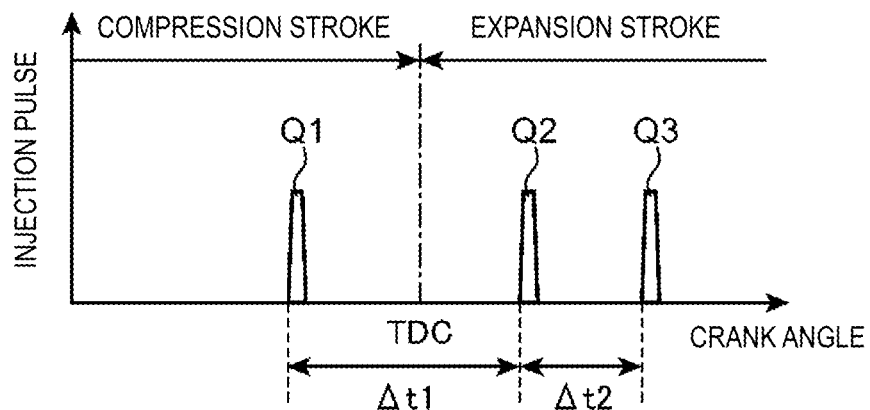
FIG. 4B is a diagram showing an injection pattern at the time of a fuel-cut regeneration control of the DPF regeneration control process.

Next to step S17, the PCM 200 proceeds to step S18. Here, in the fuel-cut regeneration control, as shown in FIG. 4B, the regenerative injection is performed as a former injection Q1 and a latter injection. Furthermore, the latter injection is performed in two injections: a first latter injection Q2 and a second latter injection Q3. In step S18, the PCM 200 sets instructed injection times that are instructed values of the injection times of the former injection Q1, the first latter injection Q2 and the second latter injection Q3, and sets instructed injection amounts that are instructed values of the injection amounts of the former injection Q1, the first latter injection Q2 and the second latter injection Q3. Details of the setting procedure will be described later.

Next to step S18, the PCM 200 proceeds to step S19. In step S19, the PCM 200 performs the injections Q1, Q2, Q3 at the instructed injection times and instructed injection amounts set in step S18. Next to step S19, the process ends (the process returns to step S10).

(Instructed Injection Amount)

A setting procedure of the instructed injection amounts of the former injection Q1, first latter injection Q2 and second latter injection Q3 performed in step S18 will be described with use of a flowchart in FIG. 5.

First, in step S20, the PCM 200 estimates a cylinder inner pressure that is the pressure in the combustion chamber 6. In the embodiment, the PCM 200 estimates the cylinder inner pressure when the piston is at the compression top dead center, using the intake pressure detected by the intake pressure sensor SN3. Specifically, the value resulting from multiplying the intake pressure and the geometric compression ratio of the engine body 1 is calculated as the cylinder inner pressure when the piston is at the compression top dead center.

After step S20, the PCM 200 proceeds to step S21. In step S21, the PCM 200 sets a basic fuel-cut total injection amount Mq0_total that is a basic value of the sum total of the injection amounts of the former injection Q1, the first latter injection Q2 and the second latter injection Q3, that is, a basic value of the total amount (hereinafter, referred to as fuel-cut total injection amount) of the injection amounts of the regenerative injection in the fuel-cut regeneration control.

Next to step S21, the PCM 200 proceeds to step S22. In step S22, the PCM 200 sets a basic former injection amount Mq0_Q1 that is a basic value of the injection amount of the former injection Q1, a basic first latter injection amount Mq0_Q2 that is a basic value of the injection amount of the first latter injection Q2, and a basic second latter injection amount Mq0_Q3 that is a basic value of the injection amount of the second latter injection Q3.

The basic former injection amount Mq0_Q1, the basic first latter injection amount Mq0_Q2 and the basic second latter injection amount Mq0_Q3 are set such that the sum is equal to the basic fuel-cut total injection amount Mq0_total calculated in step S21.

The basic former injection amount Mq0_Q1, the basic first latter injection amount Mq0_Q2 and the basic second latter injection amount Mq0_Q3 are set depending on the cylinder inner pressure estimated in step S20.

Figure 6:
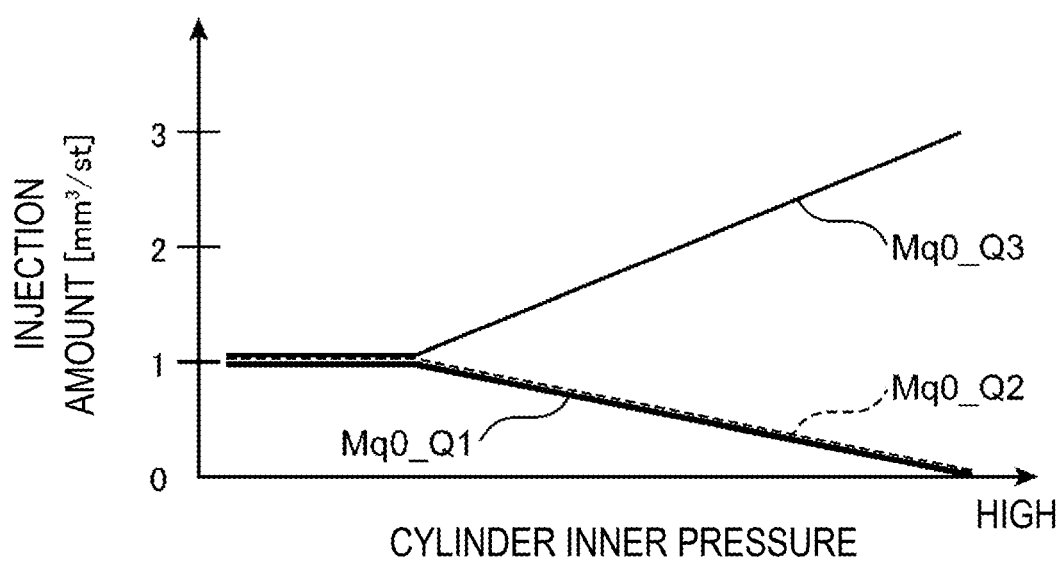
FIG. 6 is a graph showing a relation of a cylinder inner pressure and injection amounts of the former injection, the first latter injection and the second latter injection.

Specifically, as shown in FIG. 6, when the cylinder inner pressure is high, the basic former injection amount Mq0_Q1 and the basic first latter injection amount Mq0_Q2 are set to a lower value than when the cylinder inner pressure is low. On the other hand, when the cylinder inner pressure is high, the basic second latter injection amount Mq0_Q3 is set to a higher value than when the cylinder inner pressure is low. The sum total of the basic former injection amount Mq0_Q1, the basic first latter injection amount Mq0_Q2 and the basic second latter injection amount Mq0_Q3, that is, the basic fuel-cut total injection amount Mq0_total is a constant amount regardless of the cylinder inner pressure.

FIG. 6 is a diagram showing a relation of the basic former injection amount Mq0_Q1, the basic first latter injection amount Mq0_Q2 and the basic second latter injection amount Mq0_Q3 and the cylinder inner pressure when the basic fuel-cut total injection amount Mq0_total is 3 mm$^3$/st (the amount of the fuel that is injected into one combustion chamber 6 in one combustion cycle). In the example of FIG. 6, the basic former injection amount Mq0_Q1 and the basic first latter injection amount Mq0_Q2 are set to the same value as each other, for each cylinder inner pressure. Further, in this example, when the cylinder inner pressure is lower than a predetermined value, all of the three injection amounts Mq0_Q1, Mq0_Q2, Mq0_Q3 are set to 1 mm$^3$/st, and is maintained at the constant value regardless of the cylinder inner pressure. On the other hand, when the cylinder inner pressure is equal to or higher than the predetermined value, the basic former injection amount Mq0_Q1 and the basic first latter injection amount Mq0_Q2 are decreased in proportion to the cylinder inner pressure, and the basic second latter injection amount Mq0_Q3 is increased in proportion to the cylinder inner pressure.

In the PCM 200, relations of the cylinder inner pressure and the injection amounts Mq0_Q1, Mq0_Q2, Mq0_Q3 as shown in FIG. 6 are stored as maps, for a plurality of basic fuel-cut total injection amounts Mq0_total. After the basic fuel-cut total injection amount Mq0_total is set in step S21, the PCM 200 extracts a map corresponding to the basic fuel-cut total injection amount Mq0_total, and further, extracts the injection amounts Mq0_Q1, Mq0_Q2, Mq0_Q3 corresponding to the cylinder inner pressure, from the map.

Figure 5:
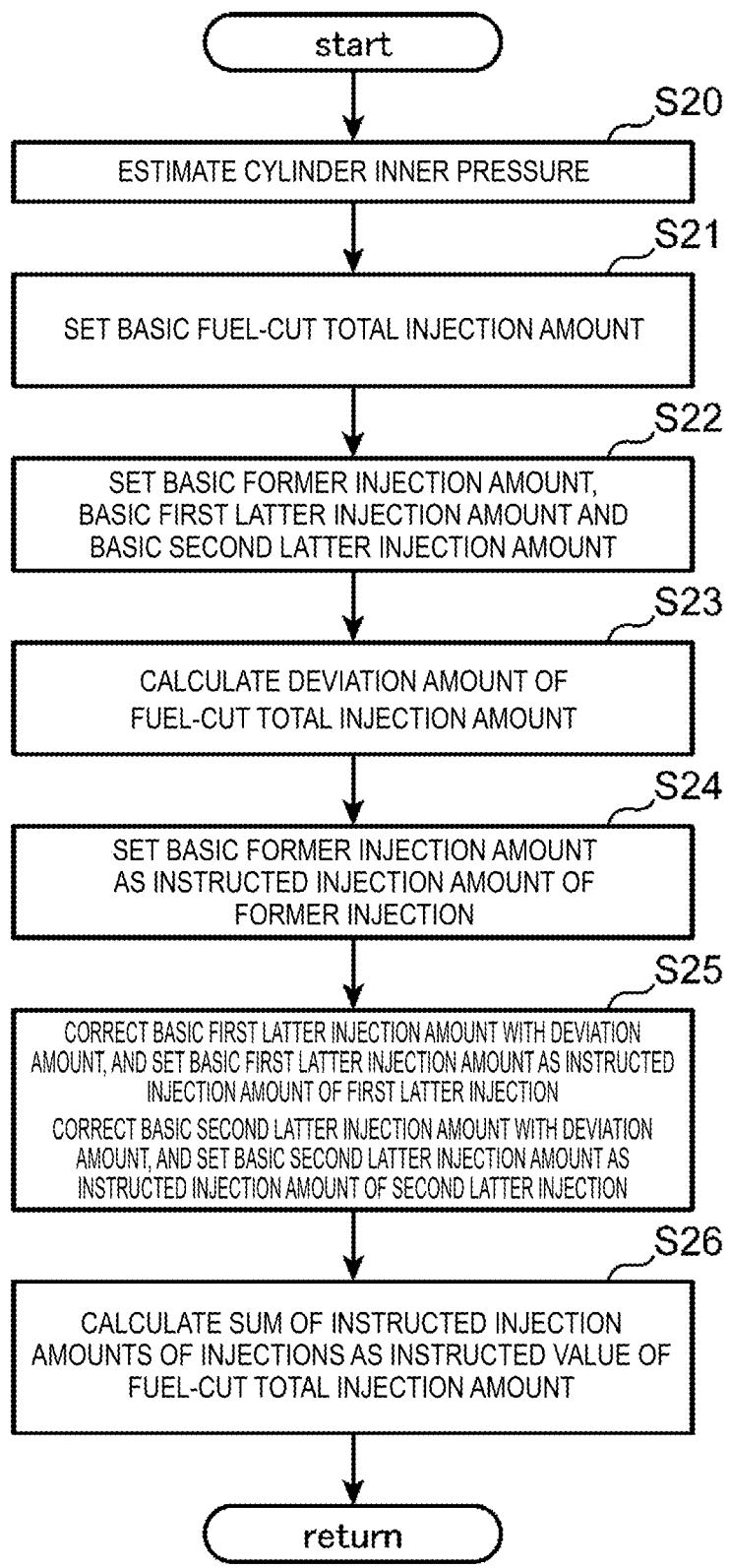
FIG. 5 is a flowchart showing a setting procedure for instructed injection amounts of a former injection, a first latter injection and a second latter injection.

Back to FIG. 5, After step S22, the PCM 200 proceeds to step S23. In step S23, the PCM 200 calculates the deviation amount between the total amount of the injection amounts of the former injection Q1, first latter injection Q2 and second latter injection Q3 performed already, that is, the actual value of the fuel-cut total injection amount and the instructed value of the fuel-cut total injection amount when the injection is performed.

Specifically, the PCM 200 estimates the actual value of the fuel-cut total injection amount, based on the exhaust O2 concentration and the flow rate of the exhaust gas. Then, as the deviation amount, the PCM 200 calculates the value resulting from subtracting the estimated actual value of the fuel-cut total injection amount from the instructed value of the fuel-cut total injection amount. Here, the estimated actual value of the fuel-cut total injection amount is the amount of the fuel injected into the combustion chamber 6 until a predetermined time (a time for which the fuel injected into the combustion chamber 6 reaches the exhaust O2 sensor) prior to the timing when the exhaust O2 concentration used for the estimation is detected by the exhaust O2 sensor. The instructed value to be compared to the actual value is the instructed value of the fuel-cut total injection amount that is set a predetermined time earlier and that is calculated in later-described step S26 performed a predetermined time earlier.

After step S23, the PCM 200 proceeds to step S24. In step S24, the PCM 200 sets the basic former injection amount Mq0_Q1 set in the step S22, as the instructed injection amount of the former injection Q1.

After step S24, the PCM 200 proceeds to step S25. In step S25, the PCM 200 corrects the basic first latter injection amount Mq0_Q2 and basic second latter injection amount Mq0_Q3 set in step S22, using the deviation amount calculated in step S23, and calculates the instructed injection amounts of the first latter injection Q2 and the second latter injection Q3.

Thus, in the embodiment, the correction based on the exhaust O2 concentration is not performed for the injection amount of the former injection Q1, and the correction based on the exhaust O2 concentration is performed only for the injection amounts of the first latter injection Q2 and the second latter injection Q3.

In the embodiment, ½ of the deviation amount is added to the basic first latter injection amount Mq0_Q2, and the resulting value is set as the instructed injection amount of the first latter injection Q2. Similarly, ½ of the deviation amount is added to the basic second latter injection amount Mq0_Q3, and the resulting value is set as the instructed injection amount of the second latter injection Q3.

For example, when the deviation amount is 2 mm$^3$/st and the calculated actual fuel-cut total injection amount is less than the instructed value by 2 mm$^3$/st, the instructed injection amount of the first latter injection Q2 is set to the value resulting from adding 1 mm$^3$/st to the basic value (basic first latter injection amount Mq0_Q2), and the instructed injection amount of the second latter injection Q3 is set to the value resulting from adding 1 mm³/st to the basic value (basic latter injection amount Mq0_Q3).

Alternatively, the deviation amount may be allocated to the basic first latter injection amount Mq0_Q2 and the basic second latter injection amount Mq0_Q3, depending on the ratio of the basic amounts.

The injection amount of the second latter injection Q3 may be further corrected depending on the temperature of the DPF 44, after step S25. For example, the instructed injection amount of the second latter injection Q3 may be corrected such that the instructed injection amount when the temperature of the DPF 44 is high is higher than that when the temperature of the DPF 44 is low.

After step S25, the PCM 200 proceeds to step S26. In step S26, the PCM 200 calculates the sum of the instructed injection amount of the former injection Q1 set in step S24, the instructed injection amount of the first latter injection Q2 set in step S25 and the instructed injection amount of the second latter injection Q3 set in step S25, as the instructed value of the fuel-cut total injection amount.

The fuel-cut total injection amount is set so as to be lower than the post injection amount at the time of the normal regeneration control, and for example, is set to about 5 mm³/st or lower.

(Injection Time)

Figure 7:
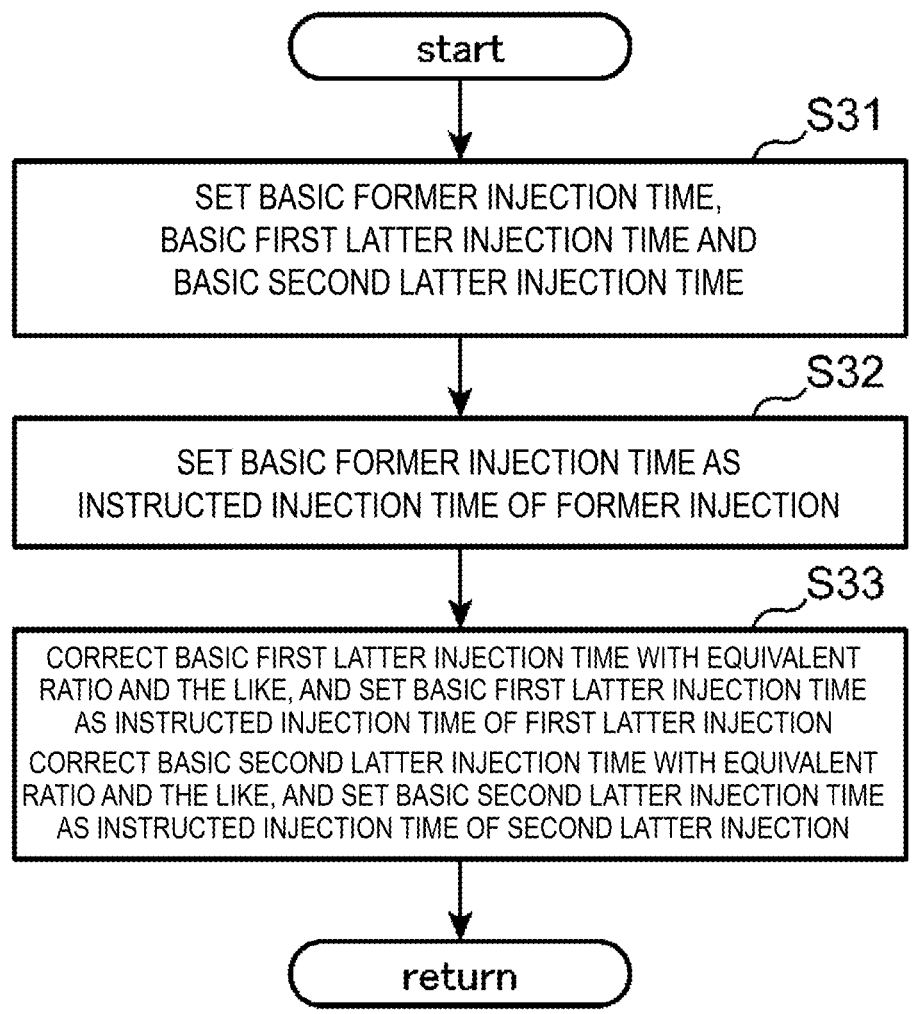
FIG. 7 is a flowchart showing a setting procedure for instructed injection times of the former injection, the first latter injection and the second latter injection.

A setting procedure of the instructed injection times of the former injection Q1, first latter injection Q2 and second latter injection Q3 performed in step S18 will be described with use of a flowchart in FIG. 7.

First, in step S31, the PCM 200 sets a basic former injection time Ti0_Q1 that is a basic value of the injection time of the former injection Q1, a basic first latter injection time Ti0_Q2 that is a basic value of the injection time of the first latter injection Q2, and a basic second latter injection time Ti0_Q3 that is a basic value of the injection time of the second latter injection Q3, depending on the cylinder inner pressure estimated in step S20.

Figure 8:
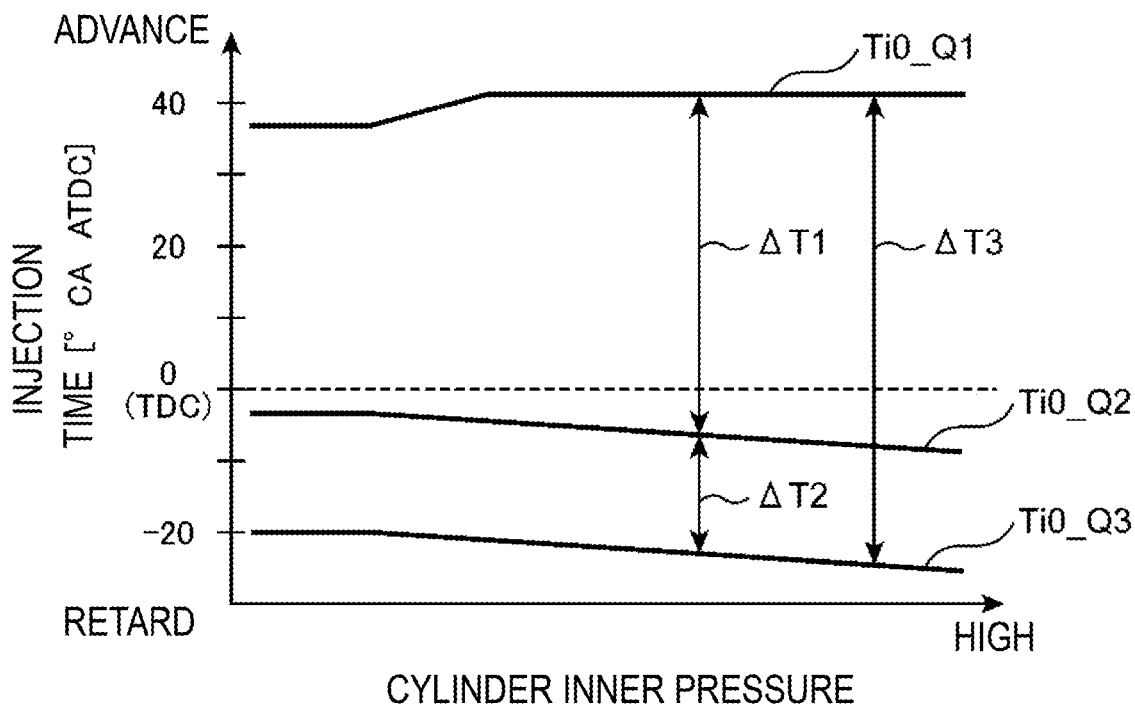
FIG. 8 is a graph showing a relation of the cylinder inner pressure and injection times of the former injection, the first latter injection and the second latter injection.

FIG. 8 is a graph showing a relation of the basic values Ti0_Q1, Ti0_Q2, Ti0_Q3 of the injection times and the cylinder inner pressure. FIG. 8 is a diagram in which the horizontal axis indicates the cylinder inner pressure and the vertical axis indicates the injection time. Further, the vertical axis in FIG. 8 indicates the value of the crank angle before the compression top dead center, 0 indicates the compression top dead center, the value on the plus side indicates the angle before the compression top dead center, and the value on the minus side indicates the angle after the compression top dead center.

As shown in FIG. 8, in the embodiment, a difference ΔT2 between the basic first latter injection time Ti0_Q2 and the basic second latter injection time Ti0_Q3 is maintained at a constant value regardless of the cylinder inner pressure. On the other hand, a difference ΔT1 between the basic former injection time Ti0_Q1 and the basic first latter injection time Ti0_Q2 and a difference ΔT3 between the basic former injection time Ti0_Q1 and the basic second latter injection time Ti0_Q3 are increased as the cylinder inner pressure is higher. In the embodiment, the injection periods of the former injection Q1, the first latter injection Q2 and the second latter injection Q3 are similar periods, and the difference of the injection times coincides with an interval (a period from the end of the previous injection to the start of the next injection) of the injections.

In the embodiment, the basic former injection time Ti0_Q1 is advanced when the cylinder inner pressure is high, compared to when the cylinder inner pressure is low.

On the other hand, the basic first latter injection time Ti0_Q2 and the basic second latter injection time Ti0_Q3 are retarded when the cylinder inner pressure is high, compared to when the cylinder inner pressure is low.

In the PCM 200, the relation of the cylinder inner pressure and the basic values Ti0_Q1, Ti0_Q2, Ti0_Q3 of the injection times as shown in FIG. 8 is stored as a map. The PCM 200 extracts values corresponding to the cylinder inner pressure estimated in step S20, from the map.

Next to step S31, the PCM 200 proceeds to step S32. In step S32, the PCM 200 sets the basic former injection time Ti0_Q1 set in step S31, as the instructed injection time of the former injection Q1.

Next to step S32, the PCM 200 proceeds to step S33. In step S33, the PCM 200 corrects the basic first latter injection time Ti0_Q2 and the basic second latter injection time Ti0_Q3, based on the equivalent ratio of the air-fuel mixture in the combustion chamber 6, the engine coolant temperature and the intake temperature, and calculates the instructed injection times of the first latter injection Q2 and the second latter injection Q3.

Specifically, the basic first latter injection time Ti0_Q2 and the basic second latter injection time Ti0_Q3 are corrected such that the instructed injection times of the first latter injection Q2 and the second latter injection Q3 are retarded when the equivalent ratio of the air-fuel mixture in the combustion chamber 6 is high, compared to when the equivalent ratio of the air-fuel mixture in the combustion chamber 6 is low, such that the instructed injection times of the first latter injection Q2 and the second latter injection Q3 are retarded when the engine coolant temperature is high, compared to when the engine coolant temperature is low, and such that the instructed injection times of the first latter injection Q2 and the second latter injection Q3 are retarded when the intake temperature is high, compared to when the intake temperature is low.

The equivalent ratio of the air-fuel mixture in the combustion chamber 6 is the ratio of the air-fuel ratio of the air-fuel mixture to the theoretical air-fuel ratio, and is the reciprocal of the excess air ratio λ. The equivalent ratio of the air-fuel mixture in the combustion chamber 6 is calculated based on the detection value of the air flow sensor SN2 or the air amount in the combustion chamber 6 estimated based on the detection value and the instructed value of the fuel-cut total injection amount calculated in step S26, that is, the total amount of the fuel to be injected to the combustion chamber 6. Further, as the engine coolant temperature, the detection value of the engine coolant temperature sensor is used. As the intake temperature, the detection value of the intake temperature sensor is used.

In the embodiment, the instructed injection times of the injections Q2, Q3 are determined by adding the correction amount set based on each of the equivalent ratio of the air-fuel mixture in the combustion chamber 6, the engine coolant temperature and the intake temperature to the basic values of the injection times of the first latter injection Q2 and the second latter injection Q3. On this occasion, the correction amount of the injection time of the first latter injection Q2 and the correction amount of the injection time of the second latter injection Q3 are the same as each other. That is, the difference ΔT2 between the injection time of the first latter injection Q2 and the injection time of the second latter injection Q3 is maintained at a constant value regardless of the equivalent ratio, the engine coolant temperature and the intake temperature.

Figure 9:
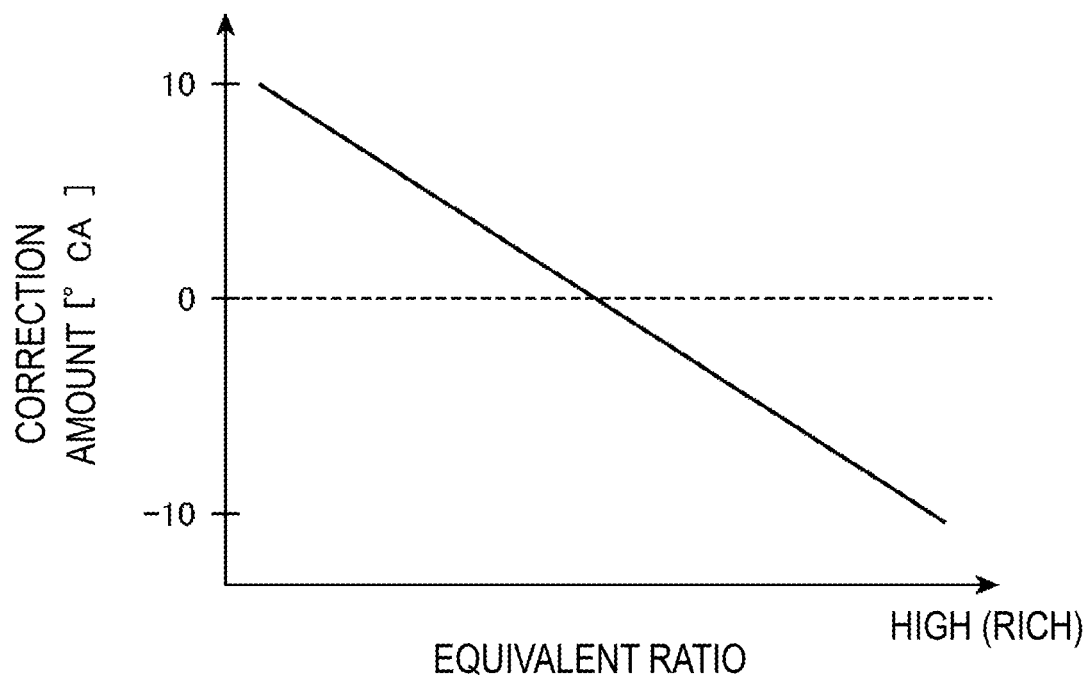
FIG. 9 is a graph showing a relation of an equivalent ratio and a correction amount of the injection times of the first latter injection and the second latter injection.
Figure 10:
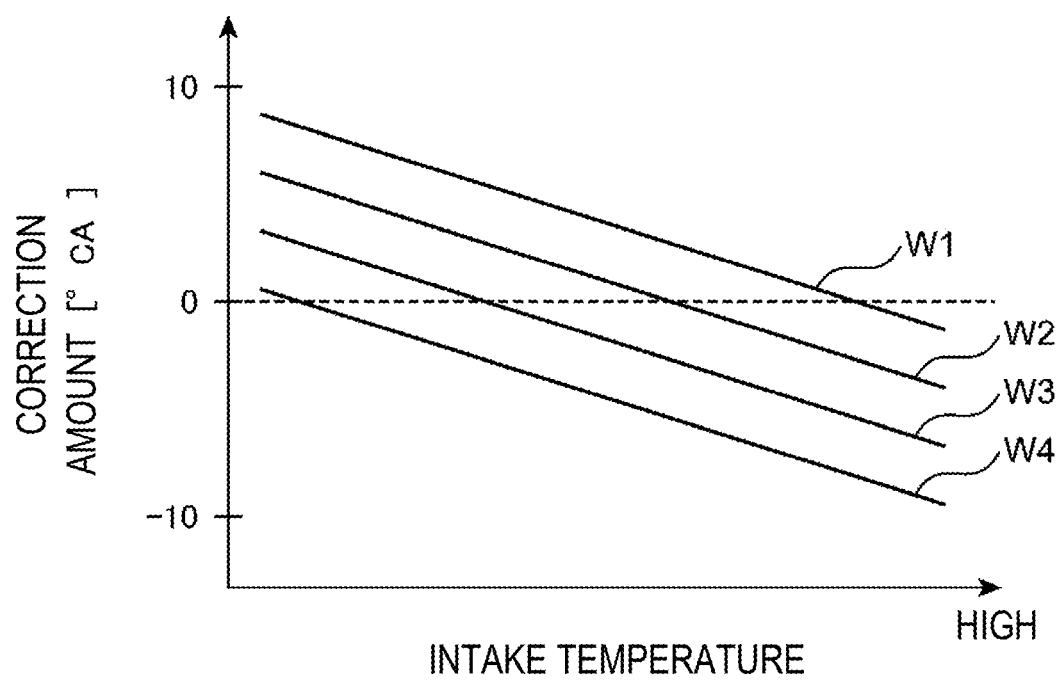
FIG. 10 is a graph showing a relation of an engine coolant temperature, an intake temperature and the correction amounts of the injection times of the first latter injection and the second latter injection.

FIG. 9 is a diagram showing a relation of the equivalent ratio in the combustion chamber 6 and the correction amount of the injection times of the first latter injection Q2 and the second latter injection Q3. FIG. 10 is a diagram showing a relation of the engine coolant temperature and the intake temperature, and the correction amount of the injection time. In FIG. 10, lines W1, W2, W3, W4 indicate correction amounts at engine coolant temperatures of 40, 60, 80 and 100° C., respectively. The vertical axes in FIG. 9 and FIG. 10 indicate the crank angle. Further, on the vertical axis, the value on the plus side from 0 indicates the correction amount on the advanced side, and the value on the minus side from 0 indicates the correction amount on the retarded side. That is, when the value on the plus side from 0 is extracted as the correction amount, the value resulting from advancing the basic value of the injection time by the extracted value is set as the instructed injection time. On the other hand, when the value on the minus side from 0 is selected, the value resulting from retarding the basic value of the injection time by the absolute value of the extracted value is set as the instructed injection time.

In the PCM 200, a map of the equivalent ratio and the correction amount of the injection time and a map of the engine coolant temperature, the intake temperature and the correction amount of the injection time are stored, as shown in FIG. 9 and FIG. 10. From the maps, the PCM 200 extracts the correction amount corresponding to the equivalent ratio of the air-fuel mixture in the combustion chamber 6 at the current time (at the time when step S33 is performed), and extracts the correction amount corresponding to the engine coolant temperature and the intake temperature at the current time (at the time when step S33 is performed). Then, the PCM 200 sets the value resulting from adding the sum of the correction amounts and the basic value of the injection time set in step S31 (when the sum of the correction amounts is a plus value, the value resulting from advancing the basic value of the injection time by the correction amount, or when the sum of the correction amounts is a minus value, the value resulting from retarding the basic value of the injection time by the correction amount), as the instructed injection time.

Thus, the instructed injection times of the injections, that is, the injection times are set using the cylinder inner pressure and the like. Here, the injection time of the former injection Q1 is set so as to be included in a latter period (a period from 90° CA before the compression top dead center to the compression top dead center) of the compression stroke, and the injection times of the first latter injection Q2 and the second latter injection Q3 are set so as to be included in a former period (a period from the compression top dead center to 90° CA after the compression top dead center) of the expansion stroke.

(3) Operation and Others

Figure 11:
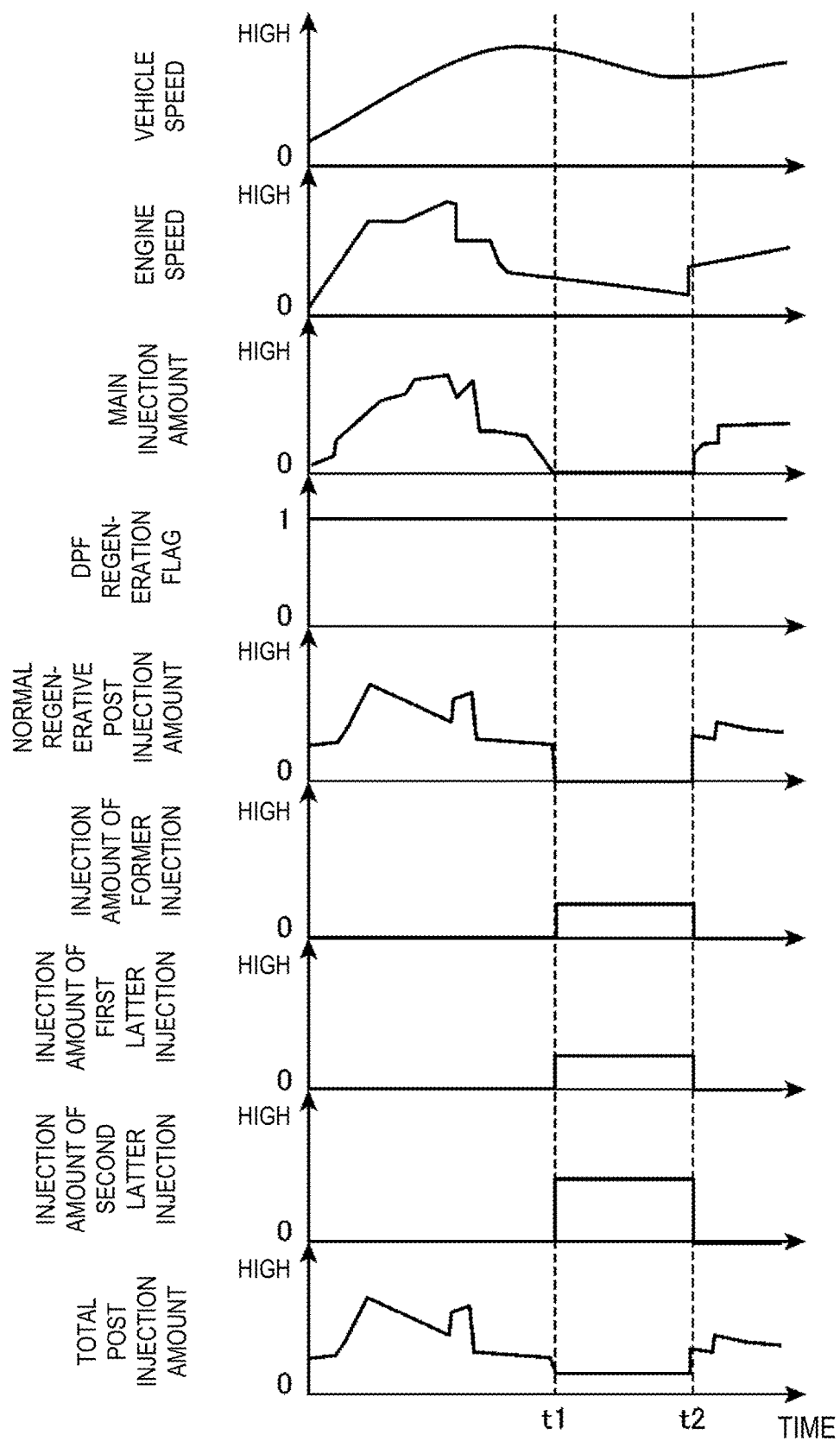
FIG. 11 is a diagram schematically showing temporal changes of parameters when the DPF regeneration control is performed.

FIG. 11 is a diagram schematically showing temporal changes of parameters when the DPF regeneration control is performed. Specifically, FIG. 11 shows temporal changes of the vehicle speed, the engine speed, a main injection amount that is the injection amount of the main injection, a DPF regeneration flag, a normal regenerative post injection amount that is the injection amount of the normal regenerative post injection, the injection amount of the former injection Q1, the injection amount of the first latter injection Q2, the injection amount of the second latter injection Q3, and a total post injection amount that is the amount resulting from subtracting the injection amount of the main injection from the total amount of the fuel to be injected into the combustion chamber 6, that is, the injection amount of the normal regenerative post injection or a fuel-cut total injection amount, in the order from the top. The DPF regeneration flag is a flag that is 1 if the DPF regeneration control is requested and is 0 otherwise.

As shown in FIG. 11, in the embodiment, in a period prior to time t1, in the case where the DPF regeneration flag is 1, where the injection amount of the main injection is higher than 0 and where the main injection is performed, the normal regenerative post injection amount is set to a value higher than 0, and the normal regenerative post injection is performed. At this time, the former injection Q1, the first latter injection Q2 and the second latter injection Q3 are stopped. Then, at time t1, due to the deceleration of the vehicle, the fuel cut is performed, and the injection amount of the main injection is set to 0. However, if the DPF regeneration flag is maintained at 1, the injection amounts of the former injection Q1, the first latter injection Q2 and the second latter injection Q3 are set to values higher than 0, and the injections Q1, Q2, Q3 are performed, although the normal regenerative post injection amount is set to 0. Then, the fuel continues to be supplied into the combustion chamber 6. At this time, the total amount of the injection amounts of the former injection Q1, the first latter injection Q2 and the second latter injection Q3 is smaller than the injection amount of the post injection when the main injection is performed. At time t2, due to the acceleration of the vehicle or the like, the main injection is restarted. Since the DPF regeneration flag is 1, the normal regenerative post injection is performed again, and the former injection Q1, the first latter injection Q2 and the second latter injection Q3 are stopped.

Thus, in the embodiment, when the DPF regeneration control is requested, the fuel is supplied to the combustion chamber 6, even when the main injection is stopped. Therefore, it is possible to increase the temperature of the DPF 44 and regenerate the DPF 44 in a shorter time.

Further, in the embodiment, when the fuel-cut is performed and the main injection is stopped in a state where the DPF regeneration control is requested, a part of the regenerative injection is performed during the compression stroke, so that the fuel is injected into the combustion chamber 6. Therefore, the fuel becomes light, and it is possible to increase the efficiency of the oxidation reaction of the fuel in the oxidation catalyst 42. Even when the temperature of the exhaust gas easily becomes low due to the stop of the main injection, it is possible to maintain the exhaust gas at a high temperature while restraining the deterioration in fuel efficiency, and to appropriately regenerate the DPF 44.

Specifically, even when the main injection is stopped, it is possible that the regeneration of the DPF 44 is attempted by performing the post injection only once during the expansion stroke similarly to the normal regeneration control. However, since the temperature of the exhaust gas easily becomes low due to the stop of the main injection, at this time, it is beneficial to increase the injection amount of the post injection and increase the temperature of the exhaust gas, as compared to when the main injection is performed. However, even when a large amount of fuel is injected during the expansion stroke, the fuel is introduced into the exhaust passage in a low-temperature and heavy state. That is, many hydrocarbons constituting the fuel are introduced into the exhaust passage, as hydrocarbons in which the number of bonded carbons is large and the molecular weight is high. Therefore, there is concern that the reactivity of the fuel in the oxidation catalyst 42 decreases, the fuel efficiency significantly deteriorates or the temperature of the DPF 44 does not sufficiently increase.

In response, in the embodiment, as described above, in DPF regeneration control that is performed at the time of the fuel cut, the fuel is injected into the combustion chamber 6 during the compression stroke. Here, the temperature of the fuel injected during the compression stroke is increased by the compression action of the piston 5. By the increase in the temperature, the fuel becomes light. That is, carbon bonds of hydrocarbons constituting the fuel are broken, so that the ratio of low-molecular-weight components contained in the fuel is increased. For example, by the injection during the compression stroke, many hydrocarbons contained in the fuel are changed from high-molecular-weight hydrocarbons having a carbon number of 16 or more to low-molecular-weight hydrocarbons having a carbon number of less than 16. Then, when the fuel becomes light, the reactivity of the fuel increases. Accordingly, as described above, by the injection of the fuel into the combustion chamber 6 during the compression stroke, it is possible to increase the reactivity of the fuel, and it is possible to appropriately conduct the oxidation reaction of a larger amount of fuel in the oxidation catalyst 42.

Moreover, in the embodiment, the first latter injection Q2 and the second latter injection Q3 are performed in addition to the former injection Q1, and the fuel is injected into the combustion chamber 6 also during the expansion stroke. Therefore, it is possible to increase the total amount of the fuel to be injected into the combustion chamber 6 and to effectively increase the temperatures of the exhaust gas and the DPF 44, while reducing the injection amount of the former injection Q1 and preventing the engine torque from being undesirably generated when the main injection is stopped. That is, for increasing the temperatures of the exhaust gas and the DPF 44, the total amount of the fuel to be injected into the combustion chamber 6 is increased. However, in the case of increasing the injection amount of the former injection Q1 that is performed during the compression stroke, there is concern of the increase in the air-fuel ratio of the air-fuel mixture when the piston 5 is close to the compression top dead center, the burning of the injected fuel and the undesired generation of engine torque. In response, by adopting the above-described configuration, it is possible to reduce the injection amount of the former injection Q1 and prevent the undesired generation of engine torque, while increasing the total amount of the fuel to be injected into the combustion chamber 6. Here, since the oxidation reaction of the fuel for the former injection Q1 is efficiently performed as described above, the temperatures of the exhaust gas and the DPF 44 are effectively increased, even when the injection amount of the former injection Q1 is reduced.

Particularly, in the embodiment, the latter injection to be performed during the expansion stroke is performed as the first latter injection Q2 and the second latter injection Q3. Therefore, when the main injection is stopped, while maintaining a large amount as the total amount of the fuel to be introduced into the oxidation catalyst 42, it is possible to prevent the engine torque from being undesirably generated due to the injection of a large amount of the fuel into the combustion chamber 6 at one time and a locally rich fuel concentration in the combustion chamber 6. Further, it is possible to diffuse and lighten the fuel, compared to when a large amount of the fuel is injected into the combustion chamber 6 at one time.

In the embodiment, as described above, the fuel-cut total injection amount that is the total amount of the fuel to be supplied to the combustion chamber 6 when the main injection is stopped is set so as to be smaller than the post injection amount in the normal regeneration control. Therefore, it is possible to more surely prevent the engine torque from being undesirably generated when the main injection is stopped.

In the embodiment, as described with use of FIG. 8, the difference $\Delta T1$ between the injection time of the former injection Q1 and the injection time of the first latter injection Q2, that is, the interval between the former injection Q1 and the latter injection is increased when the cylinder inner pressure is high, compared to when the cylinder inner pressure is low. Therefore, it is possible to restrain the fuel concentration in the combustion chamber 6 from being locally rich (high), when the cylinder inner pressure is high and the fuel is easily burnt in the combustion chamber 6. Accordingly, it is possible to more surely prevent the engine torque from being undesirably generated due to the burning of the fuel in the combustion chamber 6.

Particularly, in the embodiment, the start times of the latter injections Q2, Q3 are retarded when the cylinder inner pressure is high, compared to when the cylinder inner pressure is low, and the latter injections Q2, Q3 are performed at retarded times from the time when the piston 5 is at the compression top dead center, when the cylinder inner pressure is high, compared to when the cylinder inner pressure is low. Therefore, it is possible to more surely prevent the fuel for the latter injections Q2, Q3, particularly, the fuel for the first latter injection Q2 from being burnt in the combustion chamber 6. Further, the former injection Q1 is performed at an advanced time when the cylinder inner pressure is high, compared to when the cylinder inner pressure is low. Therefore, it is possible to diffuse the fuel for the former injection Q1 in the combustion chamber 6 before the piston 5 reaches the compression top dead center, and it is possible to avoid an air-fuel mixture having a locally rich (high) fuel concentration from being formed in the combustion chamber 6 when the piston 5 is close to the compression top dead center and to more surely prevent the fuel for the former injection Q1 from being burnt in the combustion chamber 6.

In the embodiment, as described with use of FIG. 9, the injection times of the latter injections Q2, Q3 are retarded when the equivalent ratio of the air-fuel mixture in the combustion chamber 6 is high, compared to when the equivalent ratio of the air-fuel mixture in the combustion chamber 6 is low, and the latter injections Q2, Q3 are performed at retarded times from the time when the piston 5 is at the compression top dead center, when the equivalent ratio of the air-fuel mixture is high, compared to when the equivalent ratio of the air-fuel mixture is low. Therefore, it is possible to more surely prevent the fuel for the latter injections Q2, Q3 (particularly, the fuel for the first latter injection Q1) from being burnt in the combustion chamber 6, when the equivalent ratio of the air-fuel mixture in the combustion chamber 6 is high and the fuel is easily burnt in the combustion chamber 6. On the other hand, when the equivalent ratio of the air-fuel mixture is low, the latter injection (particularly, the first latter injection Q1) is performed at a time when the piston 5 is closer to the compression top dead center, and thereby, the fuel for the latter injection can become a higher-temperature and lighter fuel.

In association with this, the difference $\Delta T1$ between the injection time of the former injection Q1 and the injection time of the first latter injection Q2, that is, the interval between the former injection Q1 and the latter injection is increased when the equivalent ratio of the air-fuel mixture is high, compared to when the equivalent ratio of the air-fuel mixture is low. Therefore, it is possible to more surely prevent the fuel concentration in the combustion chamber 6 from being locally rich when the equivalent ratio of the air-fuel mixture is high, and it is possible to more surely prevent the engine torque from being undesirably generated due to the burning of the fuel in the combustion chamber 6, when the main injection is stopped.

In the embodiment, as described with use of FIG. 10, the injection times of the latter injections Q2, Q3 are retarded when the engine coolant temperature is high, compared to when the engine coolant temperature is low, and the latter injections Q2, Q3 are performed at retarded times from the time when the piston 5 is at the compression top dead center, when the engine coolant temperature is high, compared to when the engine coolant temperature is low. Further, the injection times of the latter injections Q2, Q3 are retarded when the intake temperature is high, compared to when the intake temperature is low, and the latter injections Q2, Q3 are performed at retarded times from the time when the piston 5 is at the compression top dead center, when the intake temperature is high, compared to the intake temperature is low. Therefore, it is possible to more surely prevent the fuel for the latter injections Q2, Q3 (particularly, the fuel for the first latter injection Q1) from being burnt in the combustion chamber 6, when the fuel is easily burnt in the combustion chamber 6 because the engine coolant temperature is high and the engine body 1 is warmed up or because the intake temperature is high and the temperature in the combustion chamber 6 is high. On the other hand, when the fuel is hard to be burnt in the combustion chamber 6 because the engine coolant temperature or the intake temperature is low, the latter injection (particularly, the first latter injection Q1) is performed at a time when the piston 5 is closer to the compression top dead center, and thereby, the fuel for the latter injection can become a higher-temperature and lighter fuel.

In association with this, the difference ΔT1 between the injection time of the former injection Q1 and the injection time of the first latter injection Q2, that is, the interval between the former injection Q1 and the latter injection is increased when the engine coolant temperature is high, compared to when the engine coolant temperature is low. Further, the difference ΔT1 between the injection time of the former injection Q1 and the injection time of the first latter injection Q2, that is, the interval between the former injection Q1 and the latter injection is increased when the intake temperature is high, compared to when the intake temperature is low. Therefore, it is possible to more surely restrain the fuel concentration in the combustion chamber 6 from being locally rich, when the engine coolant temperature or the intake temperature is high, and it is possible to more surely prevent the engine torque from being undesirably generated due to the burning of the fuel in the combustion chamber 6, when the main injection is stopped.

(4) Modifications

In the embodiment, the case where the latter injection is performed as the first latter injection Q2 and the second latter injection Q3 has been described. However, only one injection may be performed as the latter injection. In the case where the latter injection is performed in two injections in this way, it is possible to more surely prevent the engine torque from being undesirably generated as described above.

In the embodiment, the case where the injection times of the first latter injection Q2 and the second latter injection Q3 are corrected with each of the equivalent ratio of the air-fuel mixture in the combustion chamber 6, the engine coolant temperature and the intake temperature has been described. However, the correction may be performed with one parameter or two parameters of them. Further, the correction of the injection times with the parameters may be eliminated.

The injection time of the second latter injection Q3 may be corrected so as to be retarded as the temperature of the DPF 44 (for example, the temperature of the exhaust gas detected by a temperature sensor provided on the upstream side of the DPF 44) increases. Specifically, a preset map that shows a relation between the temperature of the DPF 44 and a lightening rate (a parameter that has a higher value as the fuel becomes light more easily) of the fuel and that is preset such that the lightening rate increases as the temperature of the DPF 44 increases may be stored in the PCM 200. The lightening rate corresponding to the current temperature of the DPF 44 may be extracted from the map, and the injection time of the second latter injection Q3 may be corrected so as to be retarded as the lightening rate increases. Further, the injection amount of the second latter injection Q3 may be corrected so as to be decreased as the lightening rate increases. When the injection time of the second latter injection Q3 is retarded as the lightening rate increases (as the fuel becomes light more easily) in this way, it is possible to more surely prevent the fuel from being burnt in the combustion chamber 6 while the temperature of the DPF 44 is a high temperature. Further, when the injection amount of the second latter injection Q3 is decreased as the lightening rate increases as described above, it is possible to restrain the deterioration in fuel efficiency.

In the embodiment, the case where the post injection is performed only once after the main injection at the time of the normal regeneration control has been described. However, the post injection may be performed in a plurality of injections, at the time of the normal regeneration control.

REFERENCE SIGNS LIST

1 Engine body
10 Injector (fuel injection device, fuel injector)
41 NOx catalyst
42 Oxidation catalyst
44 DPF (filter)
200 PCM (controller, control circuitry, control means)

What is claimed is:

1. An exhaust gas controller for an engine, the exhaust gas controller comprising:
    circuitry configured to control an operation of a fuel injector to inject fuel into a cylinder disposed in an engine body of the engine;
    an oxidation catalyst provided in an exhaust passage of the engine through which exhaust gas is discharged from the engine body; and
    a filter provided in the exhaust passage that collects particles present in the exhaust gas, wherein
    the circuitry is further configured to
    cause the fuel injector to perform a first regenerative injection at a timing after a main injection during an expansion stroke under a first operating condition, the main injection being an injection in which the fuel is injected into the cylinder at a timing that allows engine torque to be generated, the first regenerative injection being an injection in which the fuel is injected so that resultant exhaust is used to regenerate the filter, the first operating condition being an operating condition that the main injection is performed and a regeneration condition for the filter is satisfied, and
    cause the fuel injector to perform a former injection during a compression stroke and a latter injection during the expansion stroke, as a second regenerative injection, under a second operating condition, the second regenerative injection being an injection in which the fuel is injected so that resultant exhaust is used to regenerate the filter, the second operating condition being an operating condition that the main injection is stopped and the regeneration condition for the filter is satisfied.

2. The exhaust gas controller according to claim 1, wherein
the circuitry is further configured to increase an interval between the former injection and the latter injection when a cylinder inner pressure is at or above a first inner pressure, the first inner pressure being higher than a lower second inner pressure.

3. The exhaust gas controller according to claim 2, wherein
the circuitry is further configured to advance a start time of the former injection and retard a start time of the latter injection when the cylinder inner pressure is at or above the first inner pressure.

4. The exhaust gas controller according to claim 1, wherein
the circuitry is further configured to increase an interval between the former injection and the latter injection when an equivalent ratio of air-fuel mixture in the cylinder (2) is at or above a first equivalent ratio with respect, the first equivalent ratio being higher than a lower second equivalent ration.

5. The exhaust gas controller according to claim 4, wherein
the circuitry is further configured to retard a start time of the latter injection when the equivalent ratio of the air-fuel mixture in the cylinder is at or above the first equivalent ratio.

6. The exhaust gas controller according to claim 1, wherein
the circuitry is configured to increase an interval between the former injection and the latter injection when a temperature of engine coolant to be supplied to the engine body is at or above a first temperature, the first temperature being higher than a lower second temperature.

7. The exhaust gas controller according to claim 6, wherein
the circuitry is further configured to retard a start time of the latter injection when the temperature of the engine coolant is at or above the first temperature.

8. The exhaust gas controller according to claim 1, wherein
the circuitry is further configured to increase an interval between the former injection and the latter injection when a temperature of intake gas to be introduced into the cylinder (2) is at or above a first intake gas temperature, the first intake gas temperature being higher than a lower second intake gas temperature.

9. The exhaust gas controller according to claim 8, wherein
the circuitry is further configured to retard a start time of the latter injection when the temperature of the intake gas to be introduced into the cylinder is at or above the first intake gas temperature.

10. The exhaust gas controller according to claim 1, wherein
the circuitry is further configured to initiate the former injection during a latter period of the compression stroke, and initiate the latter injection during a former period of the expansion stroke.

11. The exhaust gas controller according to claim 10, wherein
the circuitry is further configured to perform the latter injection in two injections: a first latter injection and a second latter injection.

12. The exhaust gas controller according to claim 1, wherein
the circuitry is configured to reduce an injection amount of the second regenerative injection to be performed under the second operating condition as compared with an injection amount of the first regenerative injection to be performed under the first operating condition.

13. A method for controlling exhaust gas in an engine, the method comprising:
controlling with circuitry operation of a fuel injector to inject fuel into a cylinder disposed in an engine body of the engine, the engine including an oxidation catalyst provided in an exhaust passage through which exhaust gas is discharged from the engine body, a filter being provided in the exhaust passage to collect particles present in the exhaust gas, the controlling including
performing a first regenerative injection at a timing after a main injection during an expansion stroke under a first operating condition, the main injection being an injection in which the fuel is injected into the cylinder at a timing that allows engine torque to be generated, the first regenerative injection being an injection in which the fuel is injected so that resultant exhaust is used to regenerate the filter, the first operating condition being an operating condition that the main injection is performed and a regeneration condition for the filter is satisfied, and
performing a former injection during a compression stroke and a latter injection during the expansion stroke, as a second regenerative injection, under a second operating condition, the second regenerative injection being an injection in which the fuel is injected so that resultant exhaust is used to regenerate the filter, the second operating condition being an operating condition that the main injection is stopped and the regeneration condition for the filter is satisfied.

14. The method according to claim 13, wherein
the controlling further comprises increasing an interval between the former injection and the latter injection when a cylinder inner pressure is at or above a first inner pressure, the first inner pressure being higher than a lower second inner pressure.

15. The method according to claim 14, wherein
the controlling further comprises advancing a start time of the former injection and retarding a start time of the latter injection when the cylinder inner pressure is at or above the first inner pressure.

16. The method according to claim 13, wherein
the controlling further comprises increasing an interval between the former injection and the latter injection when an equivalent ratio of air-fuel mixture in the cylinder (2) is at or above a first equivalent ratio with respect, the first equivalent ratio being higher than a lower second equivalent ration.

17. The method according to claim 16, wherein
the controlling further comprises retarding a start time of the latter injection when the equivalent ratio of the air-fuel mixture in the cylinder is at or above the first equivalent ratio.

18. The method according to claim 13, wherein
the controlling further comprises increasing an interval between the former injection and the latter injection when a temperature of engine coolant to be supplied to the engine body is at or above a first temperature, the first temperature being higher than a lower second temperature.

19. The method according to claim 18, wherein
the controlling further comprises retarding a start time of the latter injection when the temperature of the engine coolant is at or above the first temperature.

20. A non-transitory computer readable medium storing computer readable instructions that when executed by a processor perform a method for controlling exhaust gas in an engine, the method comprising:
controlling with circuitry operation of a fuel injector to inject fuel into a cylinder disposed in an engine body of the engine, the engine including an oxidation catalyst provided in an exhaust passage through which exhaust gas is discharged from the engine body, a filter being provided in the exhaust passage to collect particles present in the exhaust gas, the controlling including
performing a first regenerative injection at a timing after a main injection during an expansion stroke under a first operating condition, the main injection being an injection in which the fuel is injected into the cylinder at a timing that allows engine torque to be generated, the first regenerative injection being an injection in which the fuel is injected so that resultant exhaust is used to regenerate the filter, the first operating condition being an operating condition that the main injection is performed and a regeneration condition for the filter is satisfied, and performing a former injection during a compression stroke and a latter injection during the expansion stroke, as a second regenerative injection, under a second operating condition, the second regenerative injection being an injection in which the fuel is injected so that resultant exhaust is used to regenerate the filter, the second operating condition being an operating condition that the main injection is stopped and the regeneration condition for the filter is satisfied.

* * * * *